United States Patent
Kida

(10) Patent No.: US 9,459,413 B2
(45) Date of Patent: Oct. 4, 2016

(54) OPTICAL FIBER CONNECTOR CLEANER

(71) Applicant: SEIKOH GIKEN Co., Ltd., Matsudo-shi, Chiba (JP)

(72) Inventor: Takahisa Kida, Matsudo (JP)

(73) Assignee: SEIKOH GIKEN Co., Ltd., Matsudo-shi, Chiba (JP)

(*) Notice: Subject to any disclaimer, the term of this patent is extended or adjusted under 35 U.S.C. 154(b) by 383 days.

(21) Appl. No.: 14/210,447

(22) Filed: Mar. 14, 2014

(65) Prior Publication Data

US 2014/0259480 A1    Sep. 18, 2014

(30) Foreign Application Priority Data

Mar. 18, 2013  (JP) ................................. 2013-055257

(51) Int. Cl.
*G02B 6/38* (2006.01)
*B08B 1/00* (2006.01)

(52) U.S. Cl.
CPC ............. *G02B 6/3866* (2013.01); *G02B 6/381* (2013.01); *B08B 1/008* (2013.01); *G02B 6/38* (2013.01)

(58) Field of Classification Search
CPC ...... G02B 6/381; G02B 6/3866; G02B 6/38; B08B 1/008
See application file for complete search history.

(56) References Cited

U.S. PATENT DOCUMENTS

| | | | | |
|---|---|---|---|---|
| 6,018,835 A * | 2/2000 | Schonfeld | ............... | B08B 3/02 134/198 |
| 8,397,337 B2 * | 3/2013 | Fujiwara | ............ | G02B 6/3866 15/104.001 |
| 9,134,485 B2 * | 9/2015 | Fujiwara | ............ | G02B 6/3866 |
| 2004/0086232 A1 * | 5/2004 | Fujiwara | ............... | B08B 1/008 385/53 |
| 2004/0103491 A1 * | 6/2004 | Fujiwara | ............... | B08B 1/008 15/97.1 |
| 2011/0072600 A1 * | 3/2011 | Nakane | .................... | B08B 1/04 15/97.1 |
| 2016/0041345 A1 * | 2/2016 | Kamouchi | ........... | G02B 6/3866 15/97.1 |

FOREIGN PATENT DOCUMENTS

| | | | | |
|---|---|---|---|---|
| JP | CA 2535418 A1 * | 2/2005 | ............ | B08B 11/00 |
| JP | CA 2533143 A1 * | 7/2006 | ............ | B08B 1/00 |
| JP | 2010-191465 A | 9/2010 | | |

* cited by examiner

*Primary Examiner* — Michael Jennings
(74) *Attorney, Agent, or Firm* — Yokoi & Co., U.S.A.; Toshiyuki Yokoi

(57) ABSTRACT

The present invention provides an optical fiber connector cleaner in which the rotation of the cleaning shaft is linked with the feeding of the cleaning tape so that it is possible to wipe the dirt on the end surface of the connector off reliably. A forwarding and reversing mechanism of the optical fiber connector cleaner is formed of a fixing member contacting the second casing so as to be slidable, and a coil spring biasing the second casing forward in the one direction for the fixing member, a rotation mechanism is formed of a first rack gear disposed on the fixing member, a first gear rotatably mounted in the second casing, and a second gear connected to a base end of the shaft 14, the first gear includes first teeth fitted to the first rack gear, and second teeth fitted to the second gear.

12 Claims, 15 Drawing Sheets

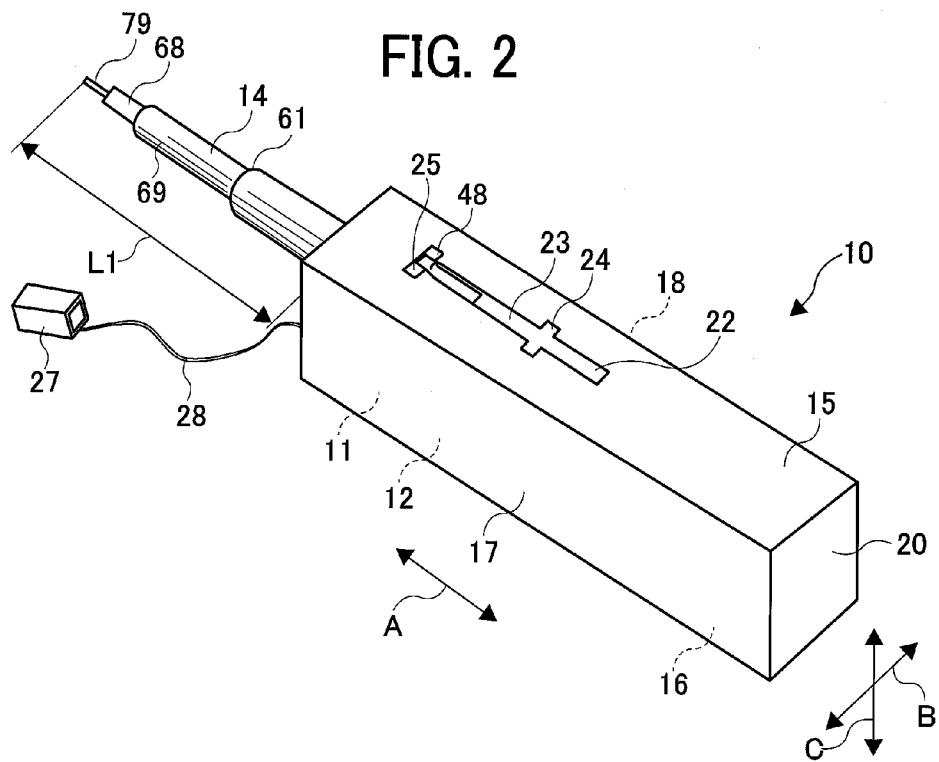
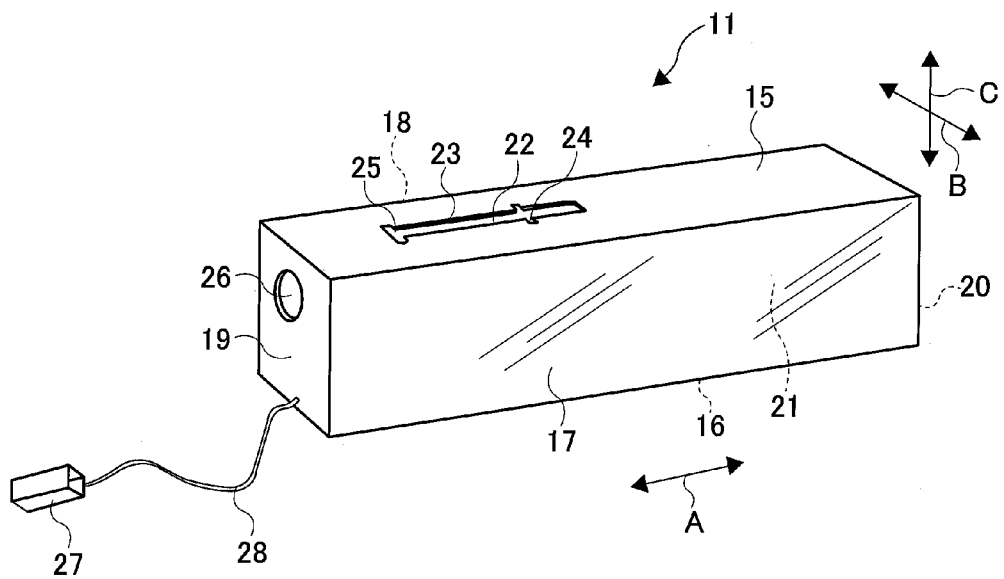

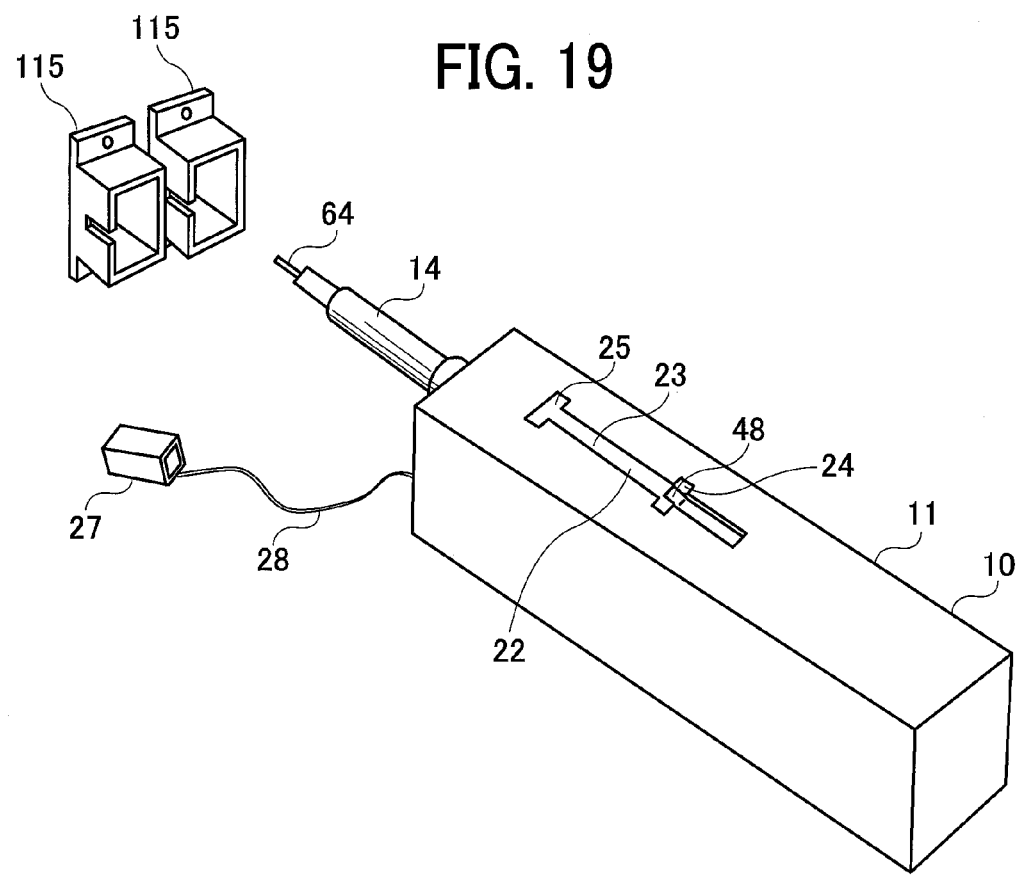
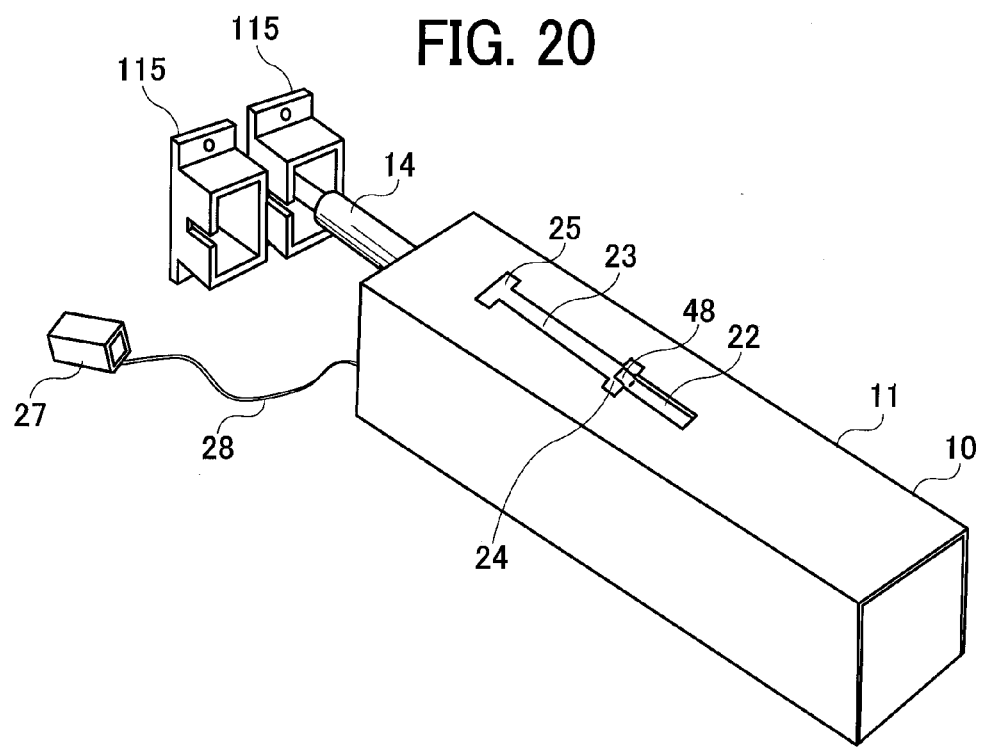

OPTICAL FIBER CONNECTOR CLEANER

CROSS-REFERENCES TO RELATED APPLICATIONS

This patent specification is based on Japanese patent application, No. 2013-055257 filed on Mar. 18, 2013 in the Japan Patent Office, the entire contents of which are incorporated by reference herein.

BACKGROUND OF THE INVENTION

1. Field of the Invention

The present invention relates to an optical fiber connector cleaner to clean an end surface of an optical fiber connector mounted in an optical communication equipment or the like.

2. Description of the Related Art

In an optical fiber connector mounted in equipment relating to the optical communication device, connection and disconnection are performed frequently. When the optical fiber connector is disconnected, dusts, oils and fats, etc. are adhered to an end surface of the optical fiber connector (ferrule end surface), and there could occur a decrease in the transmission performance of the optical signal. Therefore, cleaning of the end surface of the optical fiber connector is carried out when installed and removed. As a cleaning tool to clean the end surface of the optical fiber connector, a cleaning tool which includes a cleaning fiber wound around the distal end thereof like a cotton swab could be used.

However, when the cleaning tool like a cotton swab is used, there is a variation at each cleaning operation and by individuals, accordingly, it is difficult to perform the cleaning uniformly. Additionally, it takes a lot of time to perform the cleaning to clean a device such as an optical communication equipment in which a large number of connectors are built in. Further, cleaning fiber could fall off during the cleaning operation and could adhere to the end surface, therefore, it could cause the increase in transmission loss. In order to solve such a problem, an optical fiber connector cleaner to clean the end surface of the optical fiber connector by wiping with a feeding movement of the cleaning element has been proposed (refer to Japanese Unexamined Patent Application Publication No. 2010-191465)

The optical fiber connector cleaner disclosed in the Japanese Unexamined Patent Application Publication No. 2010-191465 includes a forwarding and reversing mechanism to move the rotation shaft forward and backward in the axial direction and a rotation mechanism to rotate the rotation shaft about its axis synchronously with the forward and backward movement. The rotation mechanism is formed of an inserting protrusion formed on the main body of the case, and a cam groove formed in the circumferential surface of the rotation shaft. In this optical fiber connector cleaner, the inserting protrusion is engaged with the cam groove, when the rotation shaft is moved backward in the axial direction, the inserting protrusion is moved in the cam groove to rotate the rotation shaft forcibly, and when the rotation shaft is moved forward in the axial direction, the inserting protrusion moves the cam groove so that the rotation shaft is rotated in the reverse direction forcibly. When the rotational movement of the rotation shaft is realized by the inserting protrusion and the cam groove, the response of the rotation of the shaft which is linked to the inserting protrusion becomes slow due to backlash of the inserting protrusion in the cam groove, accordingly, there could be a case in which the rotation of the shaft is started with a delay to the forward and backward movement of the rotation shaft in the axial direction, or a case in which the rotation of the shaft is started faster than the forward and backward movement of the shaft. If the rotation of the shaft is started with a delay to the forward and backward movement of the shaft or faster than the forwarding and reversing movement of the shaft, the feeding operation of the cleaning element could not be linked to the rotating motion of the cleaning element, therefore, the cleaning of the end surface could not be performed accurately. Accordingly, there could be a case in which it is not possible to wipe the dirt of the end surface off reliably.

The object of the present invention is to provide an optical fiber connector cleaner which can clean the end surface of the optical fiber connector reliably with a simple operation. Another object of the present invention is to provide an optical fiber connector cleaner in which the rotational motion of the cleaning shaft is linked reliably with the feeding operation of the cleaning tape so as to clean the end surface of the optical fiber connector accurately, and it is possible to wipe the dirt on the end surface off reliably.

BRIEF SUMMARY OF THE INVENTION

This patent specification describes a novel optical fiber connector cleaner which cleans an end surface of an optical fiber connector using cleaning tape and comprises a first casing which is long in one direction, a second casing provided in the first casing, a cleaning shaft extending forward in the one direction from the second casing to be exposed from the first casing, a cleaning tape, a supply reel in which the cleaning tape is wound, a winding reel to wind the cleaning tape from the supply reel, and the optical fiber connector cleaner further comprises: a forwarding and reversing mechanism to move the second casing forward and backward in the one direction in the first casing and including a fixing member provided at a predetermined position in the first casing and with which the second casing is in contact so as to be slidable, and a first biasing means to bias the second casing forward in the one direction relative to the fixing member; a winding mechanism to feed the cleaning tape from the supply reel toward the cleaning shaft in response to the backward movement of the second casing in the one direction and wind the cleaning tape returned from the cleaning shaft to the winding reel; and a rotation mechanism to rotate the cleaning shaft about the axis thereof in synchronization with the feeding of the cleaning tape in accordance with the movement of the second casing backward in the one direction, and including a first rack gear disposed on the fixing member and extending in the one direction, a first gear rotatably mounted in the second casing and having first teeth fitted to the first rack gear, and second teeth which fits to the second gear, and a second gear coupled to a base end of the cleaning shaft.

According to the optical fiber connector cleaner of the present invention, there are excellent advantages. Although the embodiments of the present invention are exemplified below, this invention is not limited to these embodiments.

The forwarding and reversing mechanism is formed of a fixing member which is disposed in the first casing and contacts the second casing so as to be slidable, and a first biasing means to bias the second casing forward in the one direction relative to the fixing member, and a rotation mechanism is formed of a first rack gear installed on the fixing member and extending in the one direction, a first gear rotatably mounted in the second casing and a second gear coupled to a base end portion of the cleaning shaft, in accordance with the forward and backward movement of the second casing in the one direction, the first rack gear is moved forward and backward in the one direction, and the first gear fitted to the first rack gear through the first teeth is rotated, the cleaning shaft connected to the second gear is rotated in the normal and reverse directions while the second gear fitted to the second teeth is rotated by a rotation of the first gear, accordingly, by moving the second casing forward and backward in the one direction in the first casing by the forwarding and reversing mechanism, it is possible to reliably rotate the cleaning shaft in the normal and reverse directions around the shaft.

In the optical fiber connector cleaner, when the distal end of the cleaning shaft is inserted into the optical fiber connector and the second casing is moved backward in the one direction, the cleaning shaft is rotated about the axis in synchronization with the feeding of the cleaning tape, accordingly, it is possible to perform the rotation operation of the cleaning shaft and the feeding operation of the cleaning tape simultaneously, therefore, it is possible to make the cleaning tape being in contact with the end surface of the optical fiber connector while the cleaning tape being moved and rotated, therefore, the optical fiber connector cleaner can easily perform cleaning of the end surface of the optical fiber connector, further, since the cleaning shaft is rotated in the normal and reverse directions, the feeding operation of the cleaning tape is linked to the rotational movement of the cleaning shaft, the feeding of the cleaning tape and the rotation of the tape are performed at the same time, accordingly, it is possible to perform cleaning of the end surface of the optical fiber connector accurately, and it is possible to reliably wipe the dirt on the end surface off.

In the optical fiber connector cleaner, in the forwarding and reversing mechanism, the second casing is moved backward in the one direction against the first biasing means when a pressing force to move the cleaning shaft backward in the one direction is applied, the second casing is moved forward in the one direction by the first biasing means when the pressure is removed, in the rotation mechanism, when the first rack gear is moved forward and backward in the one direction in accordance with the forward and backward movement of the second casing in the one direction, and the first gear fitted to the first rack gear via the first teeth is rotated, while the second gear fitted to the second teeth is rotated by a rotation of the first gear, the cleaning shaft connected to the second gear is rotated in the normal and reverse directions, the forwarding and reversing mechanism is linked to the rotation mechanism, by moving the second casing forward and backward in the one direction in the first casing, it is possible to reliably rotate the cleaning shaft in the normal and reverse directions around the shaft.

In the optical fiber connector cleaner, when the cleaning shaft is rotated in the normal and reverse directions, the tape is rotated simultaneously with the feeding of the cleaning tape, accordingly, it is possible to perform cleaning of the end surface of the optical fiber connector accurately, consequently, it is possible to reliably wipe the dirt on the end surface off.

In the optical fiber connector cleaner, the winding mechanism is formed of the second rack gear disposed on the fixing member and extending in the one direction, and the third gear fitted to the second rack gear and rotatably mounted in the second casing to rotate the winding reel, in the winding mechanism, the second rack gear is moved forward in the one direction in accordance with the backward movement of the second casing in the one direction, and the winding reel is rotated in the winding direction of the cleaning tape while the third gear fitted to the second rack gear is rotated, using the second rack gear and the third gear fitted thereto, the forwarding and reversing mechanism works with the winding mechanism, it is possible to feed the cleaning tape reliably only by an operation to move the second casing forward and backward in the one direction in the first casing. In the optical fiber connector cleaner, when the cleaning shaft is rotated in the normal and reverse directions, the tape is rotated simultaneously with the feeding of the cleaning tape, accordingly, it is possible to perform the cleaning of the end surface of the optical fiber connector accurately by the feeding of the tape and the rotation of the tape, consequently, it is possible to wipe the dirt on the end surface off, reliably.

Further, in the optical fiber connector cleaner in which the third gear includes the ratchet mechanism for rotating the winding reel only to the winding direction of the cleaning tape, when the second rack gear is moved forward in the one direction in accordance with the forward movement of the second casing in the one direction, the rotation of the third gear is prevented by the ratchet mechanism, even when the second casing is moved forward in the one direction in the first casing so that the second rack gear is moved forward in the one direction, the third gear is never rotated by the ratchet mechanism, accordingly, it is possible to prevent the cleaning tape wound in the winding reel from feeding out of the winding reel (reversal), consequently, it is possible to send the tape from the supply roller reliably.

In the optical fiber connector cleaner which includes a guide mechanism to move the cleaning tape from the one side of the outer circumferential surface of the winding reel towards the other side thereof and from the other side thereof towards the one side thereof when the cleaning tape is wound in the winding reel, if the cleaning tape is wound in one specific place of the outer circumferential surface of the winding reel, and is deviated thereto so that the bulk of the tape T is increased only in that location, the winding of the tape T in the reel becomes in a saturated condition in a short time, thereby, it is not possible to wind the tape up sufficiently, so that it is not possible to hold the tape in the optical fiber connector cleaner sufficiently, however, in the optical fiber connector cleaner of the present invention, since the cleaning tape is wound in the reel while the tape is being moved on the outer circumferential surface of the winding reel, the tape cannot be wound in the winding reel in a deviated condition and the tape is wound uniformly over the entire area of the winding reel, so that it is possible to hold sufficient amount of the tape in the optical fiber connector cleaner, consequently, it is possible to use the optical fiber connector cleaner 10 continuously for a long term.

In the optical fiber connector cleaner, in which the guide mechanism includes a fourth gear which is rotatably mounted in the second casing and is rotated in conjunction with the third gear, a fifth gear which is rotatably mounted in the second casing and is fitted to the fourth gear, a sixth gear rotatably mounted in the second casing and fitted to the fifth gear, a seventh gear rotatably mounted in the second casing and fitted to the sixth gear, a rotation shaft provided in the forward position of the winding reel in the one direction and extending from the seventh gear, and a moving block reciprocating between the one side and the other side (between the two sides edge) of the rotation shaft and being inserted into the rotation shaft, further, the rotation shaft includes a guide groove being bent to a direction around the circumference thereof and extending, further, includes an insertion hole to insert the moving block into the rotation shaft, an engagement protrusion which extends inwardly in a radial direction of the insertion hole and engages with the guide groove, and a tape insertion hole passing through the moving block and extending in one direction, the moving block having a guide protrusion which engages with the guide groove is reciprocated between the one side and the other side of the rotation shaft (between the two side edges) by the rotation of the rotation shaft, the cleaning tape inserted through the tape insertion hole is moved from the one side of the outer circumferential surface of the winding reel toward the other side by the moving block and is moved from the other side to the one side, accordingly, the tape is not wound in a deviated state, the tape is wound over the entire area of the winding reel uniformly, it is possible to hold the tape in the optical fiber connector cleaner sufficiently, consequently, it is possible to use the optical fiber connector cleaner continuously for a long term.

In the optical fiber connector cleaner in which the moving block includes a guide recess extending in the radial direction of the insertion hole and being engaged with the guide rail of the second casing extending in the axial direction of the rotation shaft, since the guide recess of the moving block is engaged with the guide rail of the second casing, the engagement between the guide projection portion and the guide groove is never released, by the rotation of the rotation shaft, the moving block having a guide protrusion which engages with the guide groove reciprocates reliably between the one side and the other side of the rotation shaft (between two side edges). Thus, in the optical fiber connector cleaner, since the moving block reciprocates reliably between the two side edge portions of the rotation shaft, the cleaning tape inserted through the tape insertion hole is moved from the one side of the outer circumferential surface of the winding reel toward the other side thereof by the moving block and is moved from the other side to the one side, the tape is not wound in a deviated state, and the tape is wound over the entire area of the winding reel uniformly, therefore, it is possible to hold the tape in the optical fiber connector cleaner sufficiently, consequently, it is possible to use the optical fiber connector cleaner continuously for a long term.

In the optical fiber connector cleaner in which the fifth to seventh gears are formed of the speed reduced gear train, the rotation speed of the rotation shaft is decelerated compared to that of the fourth gear by the speed reduced gear train, the moving block reciprocates slowly between the one side and the other side of the rotation shaft (between two side edge portions), therefore, the cleaning tape is wound on the winding reel in a state in which the rotational speed of the rotation shaft is reduced, even when the cleaning tape is moved between the one side and the other side of the outer circumferential surface of the winding reel by the guiding mechanism, the tape is not entangled, therefore, it is possible to prevent the feeding failure of the tape due to tangling of the cleaning tape.

In the optical fiber connector cleaner in which a position fixing mechanism for fixing the installation position of the second casing in the first casing by moving the second casing forward and backward in the one direction is provided, by changing the installation position of the second casing in the first casing by the position fixing mechanism, the exposed length of the cleaning shaft from the first casing can be changed, there could be a case in which it is possible to make the cleaning of the connector easy depending on the type of the optical fiber connector to be cleaned by setting the exposed length of the cleaning shaft long or short, accordingly, it is desirable to change the exposed length of the shaft freely, in this optical fiber connector cleaner, by changing the installation position of the second casing in the first casing by the position fixing mechanism, it is possible to adjust the exposed length of the cleaning shaft, therefore, it is possible to change the exposed length of the shaft to fit the type of optical fiber connector, consequently, it is possible to clean a variety connectors easily.

In the optical fiber connector cleaner in which the position fixing mechanism includes a guide portion formed in the first casing and extending in the one direction and a stopper portion formed on the fixing member to move on the guide portion forward and backward in the one direction to be engaged and fixed at a predetermined position of the guide portion, by engaging and fixing the stopper portion of the fixing member at a predetermined position of the guide portion of the first casing, the fixing member is fixed to the first casing, accordingly, by changing the engagement position of the stopper portion relative to the guide portion, it is possible to change the installation position of the second casing in the first casing.

In the optical fiber connector cleaner, by changing the installation position of the second casing in the first casing, it is possible to adjust the exposed length of the cleaning shaft, therefore, it is possible to change the exposed length of the shaft to fit the type of optical fiber connector, consequently, it is possible to clean a variety connectors easily.

In the optical fiber connector cleaner in which the cleaning tape is a strip of cloth made of ultra-fine fibers, using a cleaning tape which is aggregation of ultra-fine fibers, it is possible to collect dirt attached on the end surface of the optical fiber connector by the ultrafine fibers, it is possible to wipe the dirt on the end surface of the connector off reliably, consequently, it is possible to clean the end surface of the connector, reliably.

In the optical fiber connector cleaner in which the cleaning shaft includes a fixing pipe, a guide pipe, and a tape support shaft to form the distal end of the shaft, the guide pipe is biased forward in the one direction to the fixing pipe via the second biasing means, and the tape support shaft is biased forward in the one direction to the guide pipe via the third biasing means, when the distal end of the cleaning shaft is inserted into the optical fiber connector, and the second casing is moved backward in the one direction against the first biasing means, the tape support shaft is in contact with the end surface of the optical fiber connector at a predetermined pressing force, however, when an excess pressure greater than necessary is applied to the end face of the connector, the guide pipe is moved backward in the one direction against the second biasing means, the tape support shaft is moved backward in the one direction against the third biasing means, therefore, it is possible to reduce the pressing force applied to the end surface, accordingly, it is possible to press the tape supporting shaft against the end surface at an appropriate pressure. In the optical fiber connector cleaner, since excess pressing force greater than necessary is not applied to the end surface of the optical fiber connector, it is possible to wipe the dirt on the end surface without damaging the end surface of the connector.

In the optical fiber connector cleaner in which a distal end opening which opens in the one direction to expose the cleaning tape moving in the tape forward path to the outside of the tape supporting shaft, a distal end sliding surface extending in the radial direction of the cleaning shaft from the distal end opening and on which the cleaning tape slides, and the distal end guide surface to return the tape from the distal end sliding surface to the tape return path are formed at the distal end of the tape support shaft, after the cleaning tape being moved in the tape forward path is exposed to the outside of the support shaft from the distal end opening of the distal end portion of the tape support shaft, the tape slides on the distal end sliding surface of the support shaft, and returns to the tape return path through the distal end guide surface, accordingly, it is possible to prevent the cleaning tape from falling out of the distal end portion of the tape support shaft, additionally, it is possible to clean the end surface of the connector, reliably, while performing the rotation of the tape and feeding of the tape.

Numerous additional modifications and variations are possible in light of the above teachings. It is therefore to be understood that within the scope of the appended claims, the disclosure of this patent specification could be practiced otherwise than as specifically described herein.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 is a perspective view of an optical fiber connector cleaner in a state in which an engagement portion is engaged with a second engagement slit;

FIG. 3 is a perspective view of a first casing;

FIG. 19 is a schematic to explain an example of a cleaning procedure to clean the end surface of the optical fiber connector;

FIG. 20 is a schematic to explain the procedure which follows from FIG. 19;

DETAILED DESCRIPTION OF THE INVENTION

Figure 4:
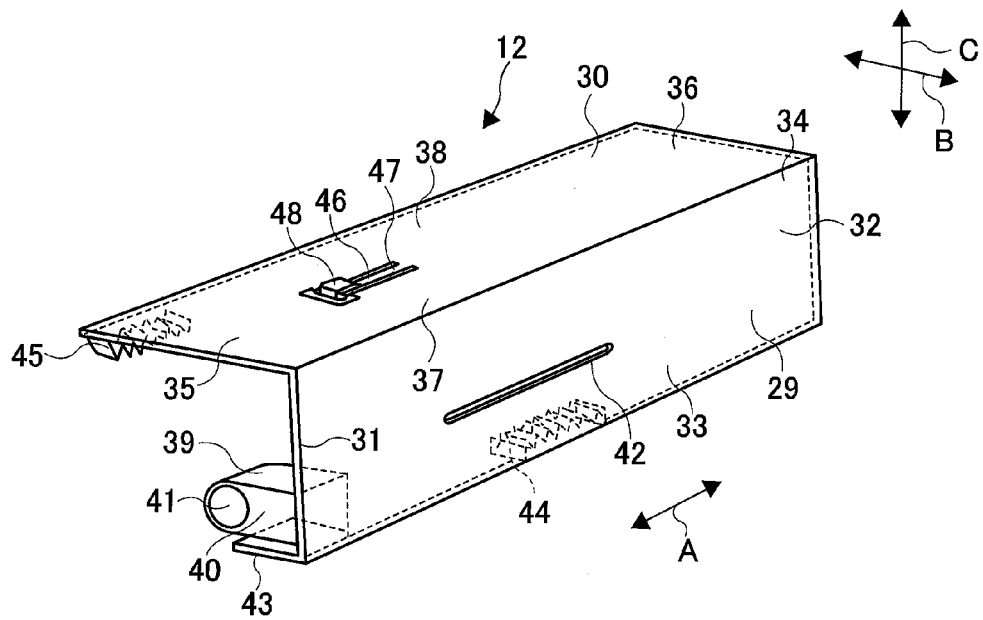
FIG. 4 is a perspective view of a fixing member.

The optical fiber connector cleaner according to the present invention is described below in detail referring to the drawings attached such as FIG. 1 which is a perspective view of the optical fiber connector cleaner 10 shown as an example, and so on. Further, FIG. 2 is a perspective view of the optical fiber connector cleaner 10 in a state in which an engagement portion 48 is engaged with a second engagement slit 25, FIG. 3 is a perspective view of a first casing 11. FIG. 4 is a perspective view of a fixing member 12, and FIG. 5 is a perspective view of a second casing 13.

Figure 1:
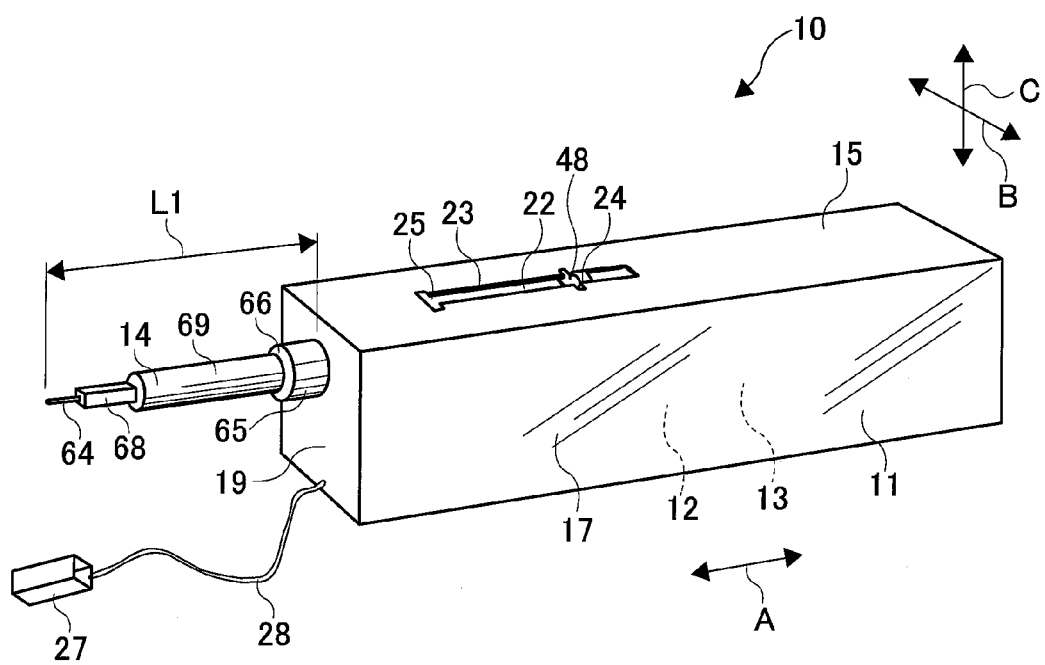
FIG. 1 is a perspective view of an optical fiber connector cleaner illustrated as an example.
Figure 5:
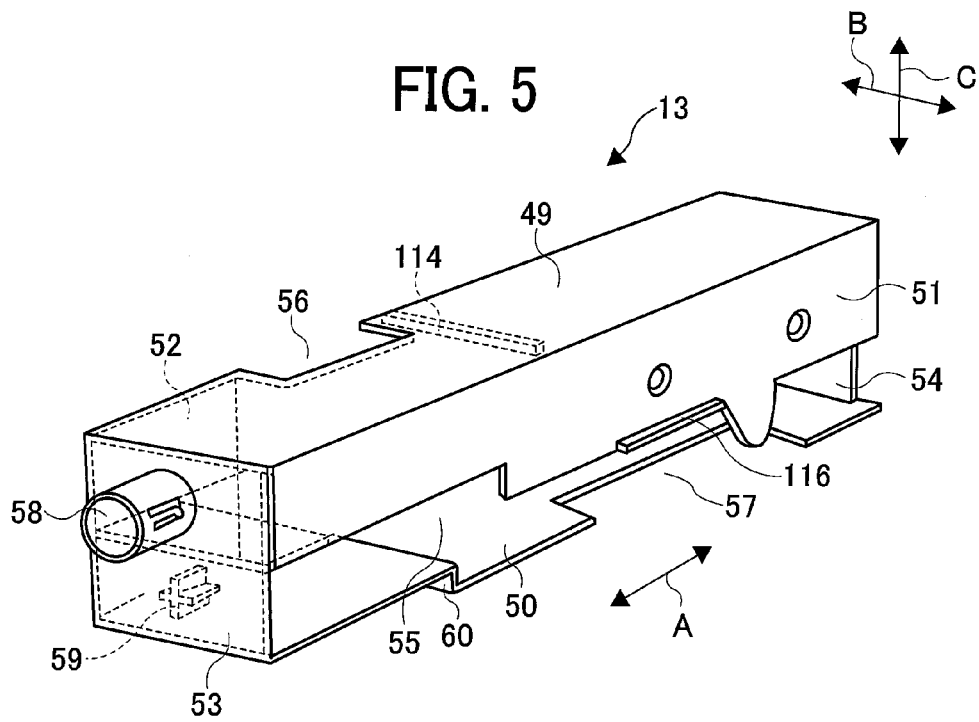
FIG. 5 is a perspective view of a second casing.

In FIGS. 1 through 5, one direction (axial direction) is shown by the arrow A, the horizontal direction (radial direction) is shown by the arrow B, and the vertical direction (radial direction) is shown by the arrows C. In FIG. 1, a state in which the engagement portion 48 is engaged with the first engagement slit 24 is shown. In FIG. 5, a shaft provided in the second casing 13 and the bearing and the like are omitted to show. The optical fiber connector cleaner 10 is used to clean the end surface (ferrule end surface) of an optical fiber connector 115 (refer to FIG. 19) using a cleaning tape T. Further, the cleaning tape T is a strip of cloth made of ultra-fine fibers. A predetermined tension is applied to the cleaning tape T so that the tape T is stretched between a supply reel 93 and a winding reel 94 described later without slack.

The optical fiber connector cleaner 10 includes a first casing 11 having a rectangular tubular shape which is long in the one direction, a fixing member 12 provided and fixed to the first casing 11, a second casing 13 having a rectangular tubular shape which is long in the one direction and provided in the first casing 11, and a cleaning shaft 14 extending forward in the one direction of the second casing 13.

The first casing 11 is a six-sided body and includes a substantially rectangular top wall 15, a substantially rectangular bottom wall 16 extending in the one direction, substantially rectangular side walls 17 and 18, a substantially rectangular front wall 19, and a substantially rectangular rear wall 20, and a containing space 21 for accommodating the fixing member 12 and the second casing 13 therein. The first casing 11 is made of plastic. Further, the shape of the walls 15 and 20 is not limited to rectangular, and the shape of the first casing 11 is not limited to tubular rectangular.

At the substantially center of the top wall 15 of the first casing 11, a guide portion 22 extending in the one direction is formed. The guide portion 22 forms a position fixing mechanism together with the stopper portion 46 of the fixing member 12, described later. The guide portion 22 is a slit formed by cutting the top wall 15 and is formed of a sliding slit 23 extending in a strip shape in the one direction, a first engagement slit 24 formed in the substantially middle of the slide slit 23, and a second engagement slit 25 formed in the front end of the slide slit 23. The lateral dimension of the engagement slits 24 and 25 is larger than that of the sliding slit 23. Now, in the guide portion 22, two slits, that is the first and second engagement slits 24 and 25 arranged in the one direction, are formed, however, there is no particular limitation on the number of engagement slits, more than three engagement slits could be formed in the guide portion 22. As shown in FIG. 1, the stopper portion 46 of the fixing member 12 is engaged with the first engagement slit 24, detachably.

On the top wall 15 side in a front wall 19 of the first casing 11, a through hole 26 of circular shape to insert a cleaning shaft 14 (fixing pipe 61 to be described later) is drilled. To the front wall 19, a hanging string 28 to which a cap 27 is connected to the distal end thereof is connected. By overlaying the cap 27 on the distal end portion of the cleaning shaft 14 (tape support shaft 64 to be described later) when the optical fiber connector cleaner 10 is not used, thereby, it is possible to prevent the dirt such as oil and dust from adhering onto the distal end of the cleaning shaft 14 (the tape support shaft 64).

The fixing member 12 is interposed between the first casing 11 and the second casing 13, disposed in a predetermined position of the first casing 11, and is fixed thereat. The fixing member 12 is made of plastic. The fixing member 12 includes a first contact plate 29 of substantially rectangular shape to be fixed to the inner surface of the side wall 17 of the first casing 11 under a condition to be contacted thereto, and a second contact plate 30 of substantially rectangular shape to be fixed to the inner surface of the top wall 15 of the first casing 11 under a condition to be contacted thereto. When it is assumed that the second casing 13 is fixed (stationary), the fixing member 12 moves back and forth in the forward direction of the one direction and backward direction of the one direction relative to the second casing 13.

The first contact plate 29 of the fixing member 12 includes a front end portion 31 being located at the forward position in the one direction and extending in the vertical direction, a rear portion 32 being located at the backward position in the one direction and extending in the vertical direction, a bottom portion 33 being located at the downward position in the vertical direction and extending in the vertical direction, and a top portion 34 being located at the upward position in the vertical direction and extending in the vertical direction. In FIG. 1, the first contact plate 29 is interposed between the inner surface of the side wall 17 of the first casing 11 and the outer surface of the side wall 51, described later, of the second casing 13, and is in contact with the side wall 51 of the second casing 13 so as to be slidable.

The second contact plate 30 of the fixing member 12 includes a front end portion 35 being located at the forward position in the one direction and extending in the horizontal direction, a rear end portion 36 being located at the backward position in the one direction and extending in the horizontal direction, two side edge portions 37 and 38 extending in the one direction between the front and rear end portions 35 and 36. In FIG. 1, the second contact plate 30 is interposed between the inner surface of the top wall 15 of the first casing 11 and the outer surface of the top wall 49 to be described later of the second casing 13, and is in contact with the top wall 49 of the second casing 13 so as to be slidable. The fixing member 12 is formed to be a substantially angled shape in which the upper end portion 34 of the first contact plate 29 is connected to the side edge portion 37 of the second contact plate 30 in series.

A spring support seat 39 is connected to a front portion 31 of the first contact plate 29 at the vicinity of the lower end portion 33. The spring support seat 39 is formed of a connection portion 40 extending laterally from the front end portion 31, and a containing recess 41 for holding a base end of the coil spring 92 (first biasing means). When the fixing member 12 is disposed so as to be slidable in the first and second casing 11 and 13, the spring support seat 39 is located inside the second casing 13. In the substantially center of the first contact plate 29, a guide slit 42 extending in the one direction is punched. An engagement plate 43 extending laterally is connected to the lower end portion 33 of the first contact plate 29 at the vicinity of the front end portion 31.

In the substantially center of the lower portion 33 of the first contact plate 29, a rack gear 44 (second rack gear) extending in the one direction is formed. The rack gear 44 is connected with the lower portion 33 of the first contact plate 29 and extending laterally toward the inward from the lower end portion 33. When the fixing member 12 is moved forward in the one direction, the rack gear 44 is moved forward in the one direction in response to the forward movement, and when the fixing member 12 is moved backward in the one direction, the rack gear 44 is moved backward in the one direction in response to the backward movement.

In a side edge portion 38 of the second contact plate 30 at the vicinity of the front end portion 35, a rack gear 45 (first rack gear) extending in the one direction is formed. The rack gear 45 is connected to the under edge portion of the side edge portion 38 of the second contact plate 30 in series, and extending downward from the side edge portion 38. When the fixing member 12 is moved forward in the one direction, the rack gear 45 is moved forward in the one direction in response to the forward movement, and when the fixing member 12 is moved backward in the one direction, the rack gear 45 is moved backward in the one direction in response to the backward movement.

In the substantially center of the front end portion 35 of the second contact plate 30, a stopper portion 46 extending in the one direction is formed. The stopper portion 46 is formed by cutting the substantially center of the second contact plate 30 in a belt shape, and includes an elastic portion 47 which is long in one direction and an engagement portion 48 formed at the distal end of the elastic portion 47. The base end of the elastic portion 47 is connected to the second contact plate 30 in series, and is inclined in an upward slope vertically towards the distal end from the base end. The engagement portion 48 is separated from the second contact plate 30 toward upward vertically. The lateral dimension of the engagement portion 48 is larger than that of the elastic portion 47 and the slide slit 23 of the guide portion 22, and is substantially equal to or slightly smaller than that of the first and second engagement slits 24 and 25 of the guide portion 22.

When the engagement portion 48 of the stopper 46 is located at the sliding slit 23 of the guide portion 22, since the lateral dimension of the engagement portion 48 is larger than that of the sliding slit 23, the engagement portion 48 locates at the under portion of the sliding slit 23 and contacts the slit 22 so as to be slidable, and a downward pressing force is applied on the elastic portion 47 of the stopper portion 46 being inclined upward, the elastic part 47 is pressed downward against the elastic force thereof and stretching substantially horizontally in the one direction. By moving the fixing member 12 forward or backward in the one direction in this state, it is possible to change the position of the fixing member 12 relative to the first casing 11.

When the fixing member 12 is moved forward or backward in the one direction and the engagement portion 48 of the stopper portion 46 is positioned at the first engagement slit 24 or the second engagement slit 25 of the guide portion 22, since the lateral dimension of the engagement portion 48 is substantially equal to or slightly smaller than that of the engagement slits 24 and 25, the engagement portion 48 can enter the first engagement slit 24 and the second engagement slit 25, the pressing force applied to the elastic portion 47 of the stopper portion 46 is removed, and the elastic portion 47 is inclined upward by the elastic force. When the elastic portion 47 is inclined upward, the engagement portion 48 enters the first engagement slit 24 or the second engagement slit 25, and the engagement portion 48 is engaged with the first engagement slit 24 or the second engagement slit 25, so that the movement of the fixing member 12 towards forward in the one direction or towards backward in the one direction is prevented and the fixing member 12 is fixed to the first casing 11 at the position of the first engagement slit 24 or the second engagement slit 25.

In order to move the fixing member 12 forward or backward in the one direction from a state in which the fixing member 12 is fixed to the first casing 11 by the engagement portion 48 engaged with the engagement slit 24 or 25, the engagement portion 48 is pressed downward vertically against the elastic force of the elastic portion 47 of the stopper portion 46, the fixing member 12 is moved so that the fixing member 12 is moved forward or backward in the one direction while the engagement of the engagement slit 24 or 25 with the engagement portion 48 is released by pressing the engagement portion 48 down.

When the fixing member 12 is moved, the engagement portion 48 of the stopper portion 46 enters the lower side of the slide slit 23 of the guide portion 22, the engagement portion 48 contacts the slit 23 so as to be slidable. By moving the fixing member 12 forward or backward in the one direction in this state, it is possible to move the engagement portion 48 from the first engagement slit 24 to the second engagement slit 25 and move the engagement portion 48 from the second engagement slit 25 to the first engagement slit 24.

When the engagement portion 48 is moved from the first engagement slit 24 to the second engagement slit 25 gradually, the cleaning shaft 14 is exposed gradually from the through hole 26 of the first casing 11. Comparing a case in which the engagement portion 48 is engaged with the first engagement slit 24 with a case in which the engagement portion 48 is engaged with the second engagement slit 25, the exposed length L1 of the cleaning shaft 14 from the first casing 11 becomes long, as shown in the FIG. 2.

By setting the exposed length of the cleaning shaft 14 short or long depending on the type of the target optical fiber connector 115 to be cleaned, there could be a case in which it becomes easy to clean the connector 115, accordingly, it is preferable that the exposed length of the shaft 14 can be changed freely, however, in the optical fiber connector cleaner 10, since it is possible to adjust the exposed length of the cleaning shaft 14 by changing the installation position of the second casing 13 in the first casing 11 by the position fixing mechanism, it is possible to change the exposed length of the shaft 14 to fit for the type of connector 115 and clean a various types of connectors 115 easily.

As shown in FIG. 5, the second casing 13 is a six-sided body which includes a top wall 49 and a bottom wall 50 of the substantially rectangular shape extending in the one direction, two side walls 51 and 52 extending in the one direction, and front wall 53 and rear wall 54 of substantially rectangular shape, and a containing space 55 for containing various mechanisms described later therein. The second casing 13 is made of plastic. The length of the second casing 13 in the one direction is smaller than that of the first casing 11, the second casing 13 has a size to fit for the containing space 21 of the first casing 11. Further, the shape of the walls 49 through 54 is not limited to rectangular, and the shape of the second casing 13 is not limited to square tubular.

A first opening 56 opening in the one direction is punched in the vicinity of the front wall 53 in the side wall 52 and the top wall 49 of the second casing 13. At substantially the center of the bottom wall 50 of the second casing 13 and the lower part of the side wall 51, a second opening 57 opening to the one direction is punched. When the fixing member 12 is fixed to the first casing 11 and the second casing 13 is provided (containing), the rack gear 45 (first rack gear) is located at the first opening 56, and the rack gear 44 (second rack gear) is located at the second opening 57. In the approximate center of the side wall 51 of the second casing 13, a guide bar 116 which is long in the one direction and is to be engaged with the guide slit 42 of the fixing member 12 is formed.

In the top wall 49 side in the front wall 53 of the second casing 13, the circular cylindrical through hole 58 to insert the cleaning shaft 14 (connection shaft 76 of the guide pipe 62 to be described later) is drilled. In the bottom wall 50 side in the front wall 53 of the second casing 13, a spring support protrusion 59 extending backward in the one direction is provided. To the spring support protrusion 59, the distal end portion of the coil spring 92 enters the distal end portion thereof so that the distal end portion thereof is supported. At the front wall 53 side in the bottom wall 50 of the second casing 13, the step portion 60 with which the rear end of the engagement plate 43 of the fixing member 12 is in contact is formed. The second casing 13 is moved forward and backward in the one direction relative to the fixing member 12 (the first casing 11), when it is assumed that the fixing member 12 (first casing 11) is fixed (stationary).

Figure 6:
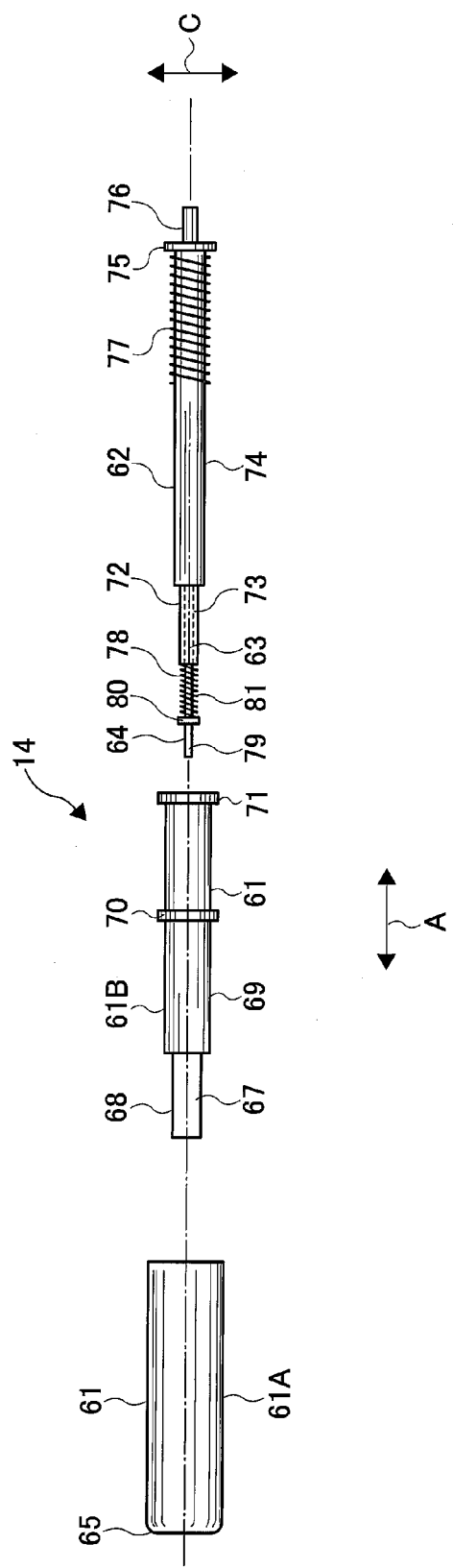
FIG. 6 is an exploded perspective view of a cleaning shaft.
Figure 7:
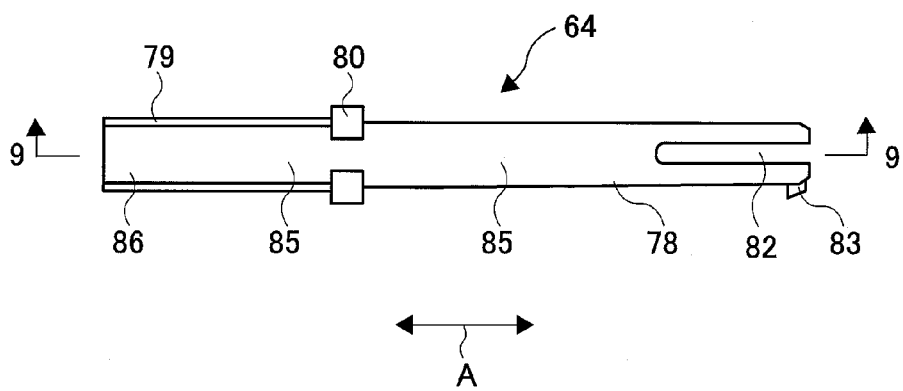
FIG. 7 is a top view of a tape support shaft.
Figure 8:
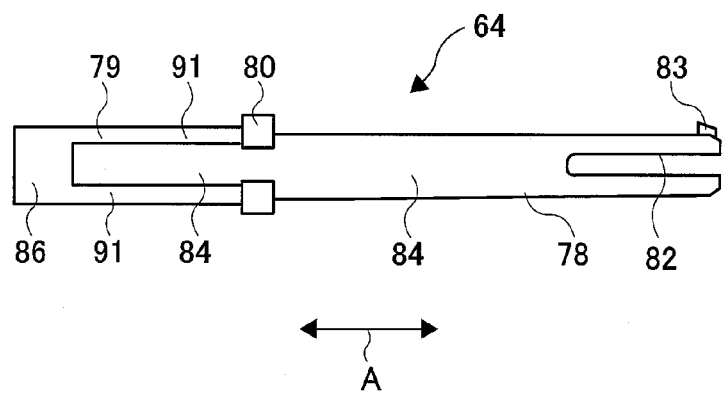
FIG. 8 is a bottom view of the tape support shaft.
Figure 9:
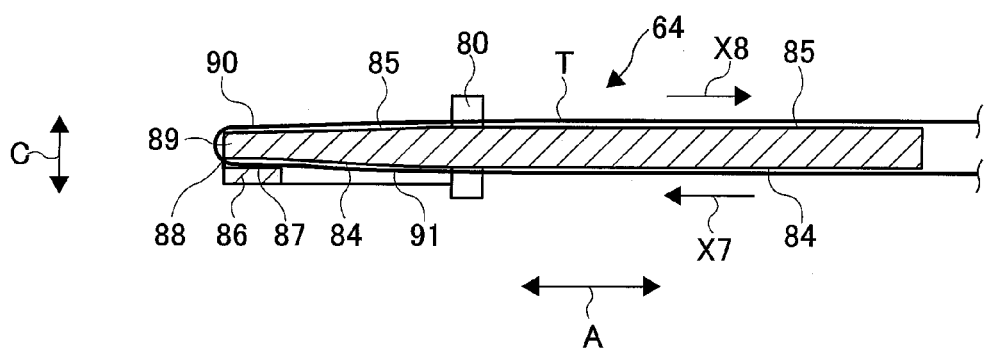
FIG. 9 is a sectional view along the line 9 to 9 of FIG. 7.
Figure 10:
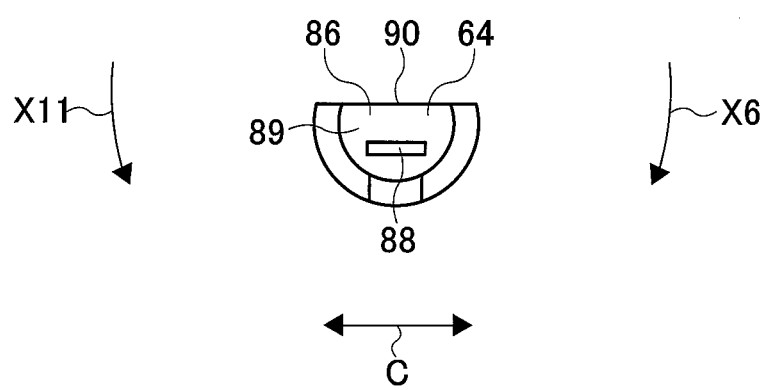
FIG. 10 is a front view of an exposing shaft.
Figure 11:
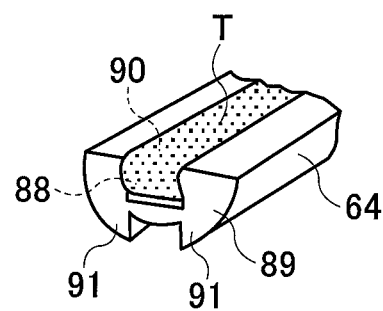
FIG. 11 is a perspective view of the distal end of the exposing shaft.

FIG. 6 is an exploded perspective view of the cleaning shaft 14, FIG. 7 is a top view of a tape support shaft 64. FIG. 8 is a bottom view of the tape support shaft 64, FIG. 9 is a section view along the line 9 to 9 of FIG. 7. FIG. 10 is a front view of the exposing shaft 79, and FIG. 11 is a perspective view of the distal end portion 86 of the exposing shaft 79. In FIGS. 6 through 9, the one direction is indicated by an arrow A (axial direction), the radial direction is indicated by arrow C. In FIG. 10, the radial direction is indicated by the arrow C.

The cleaning shaft 14 is formed of a fixing pipe 61 of cylindrical shape which is detachably fixed to the front wall 53 of the second casing 13, a guide pipe 62 of cylindrical shape which is inserted in the fixing pipe 61 so as to be moved forward and backward in the one direction and be rotatable, and a tape support shaft 64 which is connected rotatably and movably to the distal end portion 63 of the guide pipe 62 in the one direction.

The fixing pipe 61 is made of plastic, and is formed of a first fixing pipe 61A which is long in the one direction and a second fixing pipe 61B which is long in the one direction. At the distal end portion 65 of the first fixing pipe 61A, a flange 66 projecting radially inwardly (refer to FIG. 1) is formed. The diameter of the second fixing pipe 61B is smaller than that of the pipe 61A, the second fixing pipe 61B is inserted rotatably in the pipe 61A and is movable forward and backward in the one direction. The second fixing pipe 61B includes a first supporting pipe 68 being located at the distal end 67 and inserted to support the tape support shaft 64, and a second support pipe 69 extending backward in the one direction from the first support pipe 68. The diameter of the first support pipe 68 is smaller than that of the second support pipe 69. In the middle portion of the second support pipe 69, a first flange 70 projecting outward in the radial direction is formed, at the rear end portion of the second support pipe 69, a second flange 71 projecting outward in the radial direction is formed.

The guide pipe 62 is made of plastic, and includes a first pipe 73 which is located at the distal end 72 and long in the one direction to support the tape support shaft 64 and a second pipe 74 extending backward in the one direction from the first pipe 73. The diameter of the first pipe 73 is smaller than that of the second pipe 74. At the rear end portion of the second pipe 74, a flange 75 projecting outward in the radial direction, and a connection shaft 76 extending backward in the one direction from the flange 75 (base end) are formed. The connection shaft 76 is detachably connected to the gear 99 (second gear) of the rotation mechanism to be described later.

To the second pipe 74, a coil spring 77 (second biasing means) is fitted. The rear end of the coil spring 77 is in contact with the flange 75. In the guide pipe 62 (the first pipe 73 and second pipe 74), a tape forward path (space) (not shown) in which the cleaning tape T is moved from the connection shaft 76 (base end portion) toward the distal end portion 72, and a tape return path (space) (not shown) in which the tape T is moved from the distal end portion 72 toward connection shaft 76 (base end portion) are formed.

The tape support shaft 64 is made of plastic, and forms the distal end portion of the cleaning shaft 14. The tape support shaft 64 includes an insertion shaft 78 which is long in the one direction and inserted detachably into the first pipe 73 of the guide pipe 62 and an exposing shaft 79 extending forward in the one direction from the insertion shaft 78 and being long in the one direction. Between the insertion shaft 78 and the exposing shaft 79, a flange 80 projecting outward in the radial direction is formed. To the insertion shaft 78, a coil spring 81 (third biasing means) is fitted. The distal end of the coil spring 81 contacts the flange 80.

At the rear end portion of the insertion shaft 78, a slit 82 (notch) extending in one direction and an engagement protrusion 83 which is projecting outward in the radial direction are formed. At the under portion of the outer circumferential surface of the insertion shaft 78, as shown in FIG. 8, a tape forward path 84 extending in the one direction in a flat state is formed, at the under portion of the outer circumferential surface of the exposing shaft 79, a tape forward path 84 extending in the one direction in flat state is formed. The tape forward path 84 is connected to a tape forward path of the guide pipe 62 in series. In the tape forward path 84, the flange 80 is cut, and the tape forward path 84 of the insertion shaft 78 and the tape forward path 84 of the exposing shaft 79 are connected in series.

At the upper portion of the outer circumferential surface of the insertion shaft 78, as shown in FIG. 7, a tape return path 85 extending in the one direction in a flat state is formed. At the upper portion of the outer circumferential surface of the exposing shaft 79, a tape return path 85 extending in the one direction in flat state is formed. The tape return path 85 is connected to a tape return path of the guide pipe 62 in series. In the tape return path 85, the flange 80 is cut, and the tape return path 85 of the insertion shaft 78 and the tape return path 85 of the exposing shaft 79 are connected in series.

The distal end portion 86 of the exposing shaft 79 is formed to have a tapered shape toward forward in the one direction. To the distal end portion 86 (distal end portion of the tape support shaft 64) of the exposing shaft 79, as shown in FIG. 9, a tape flow through hole 87 which is connected to the tape forward path 84 is formed. At the distal end of the exposing shaft 79, as shown in FIG. 10, a distal end opening 88 which is open in the one direction and is connected to the tape flow through hole 87, a distal end sliding surface 89 extending in the radial direction of the tape support shaft 64 (cleaning shaft 14) from the distal end opening 88, and a distal end guide surface 90 to return the cleaning tape T from the distal end sliding surface 89 to the tape return path 85 are formed. On the both sides of the tape return path 85 of the distal end portion 86 of the exposing shaft 79 in the radial direction, a guide wall 91 extending in the one direction is formed.

The distal end opening 88 is located below the center of the distal end portion 86 of the exposing shaft 79, and is elongated in the radial direction. The distal end opening 88 exposes a cleaning tape T which is moved in the tape forward pass 84 to the outside of the (tape support shaft 64) exposing shaft 79. At the distal end sliding surface 89, the cleaning tape T which is exposed to the outside of the exposing shaft 79 from the distal end opening 88 slides (moving upward from the distal end opening 88). In the tape support shaft 64, as shown in FIG. 9, the cleaning tape T is moved forward in the one direction through the tape forward path 84 of the exposing shaft 79 from the tape forward path 84 of the insertion shaft 78, after the tape T enters the tape flow through hole 87, the tape T is exposed from the distal end opening 88 to the outside of the shaft 79, and is moved further to the tape return path 85 of the insertion shaft 78 from the tape return path 85 of the exposing shaft 79 through the distal end sliding surface 89.

In the cleaning shaft 14, the second fixing pipe 61B is inserted into the first fixing pipe 61A. When the second fixing pipe 61B is inserted into the first fixing pipe 61A, the flange 70 of the second fixing pipe 61B contacts the flange 66 of the first fixing pipe 61A, it is prevented that the second fixing pipe 61B in the first fixing pipe 61A moves further forward in the one direction. After the coil spring 81 is fitted to the insertion shaft 78 of the tape support shaft 64, the insertion shaft 78 of the tape support shaft 64 is inserted into the first pipe 73 of the guide pipe 62.

When the insertion shaft 78 is inserted into the first pipe 73, the engagement protrusion 83 of the rear end portion of the insertion shaft 78 contacts the inner circumferential surface of the first pipe 73, thereby, the slit 82 of the rear end portion of the insertion shaft 78 is reduced inwardly in the radial direction, the rear end portion of the insertion shaft 78 is elastically deformed so that the rear portion thereof enters the interior of the first pipe 73. When the rear portion enters the interior of the first pipe 73, the distal end of the coil spring 81 contacts the flange 80 of the tape support shaft 64, and the rear end of the coil spring 81 contacts the distal end of the first pipe 73. Further, the engagement protrusion 83 is pressed against the inner circumferential surface of the first pipe 73 by the elastic force of the rear end portion in which the slit 82 is formed, the rear end portion of the insertion shaft 78 is fixed to the inner side of the first pipe 73 so that accidental falling off of the tape support shaft 64 from the first pipe 73 is prevented.

Next, the guide pipe 62 (first pipe 73 and second pipe 74) in which a tape support shaft 64 is fixed is inserted into the second fixing pipe 61B. When the guide pipe 62 is inserted into the second fixing pipe 61B, the flange 80 of the tape support shaft 64 contacts the rear end of the first supporting pipe 68 of the second fixing pipe 61B, therefore, it is prevented that the tape support shaft 64 moves forward in the one direction further in the second fixing pipe 61B. Further, the distal end of the coil spring 77 contacts the flange 71 of the second fixing pipe 61B, and the rear end of the coil spring 77 contacts the flange 75 of the second pipe 74.

Further, in the rear end portion of the first fixing pipe 61A and the through hole 58 of circular cylindrical shape of the front wall 53 of the second casing 13, a fixing means to fix the fixing pipe 61A detachably to the front wall 53 of the second casing 13 is formed. When the fixing pipe 61A is fixed to the front wall 53 of the second casing 13, the connection shaft 76 of the guide pipe 62 is located in the containing space 55 of the front wall 53 side of the second casing 13 while the connection shaft 76 of the guide pipe 62 is passing through the through hole 58.

Figure 12:
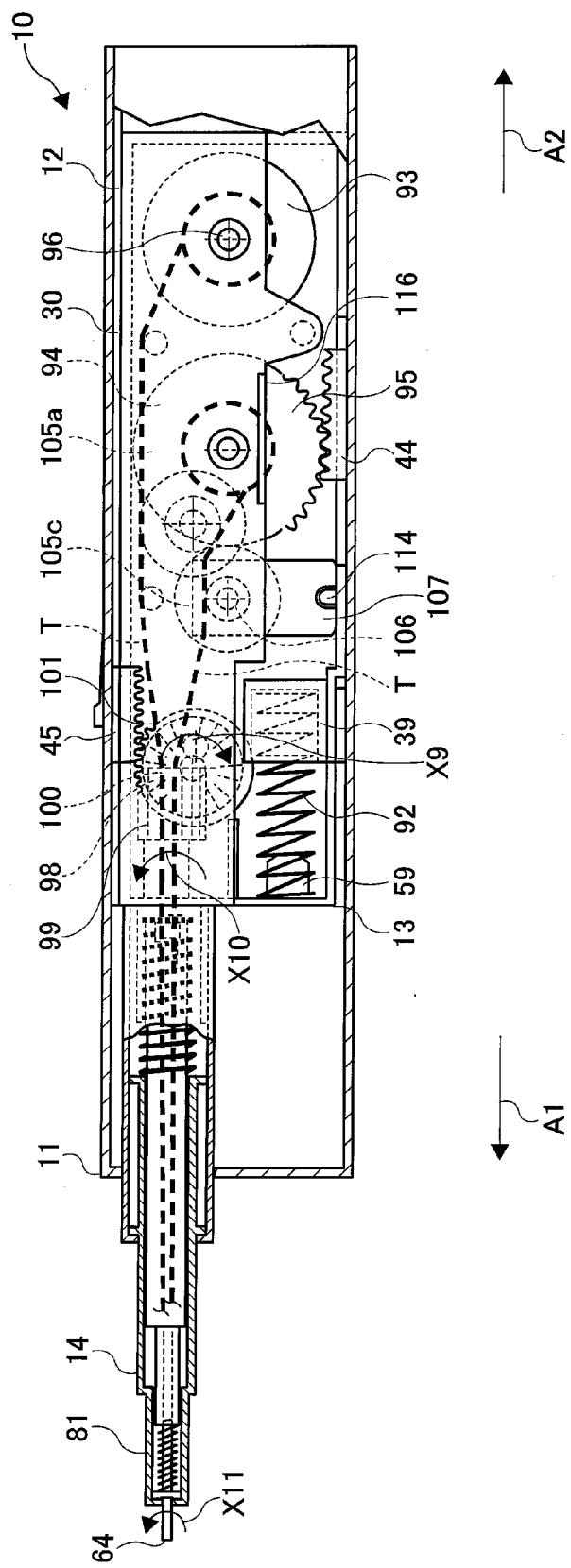
FIG. 12 is a side view of the optical fiber connector cleaner.
Figure 13:
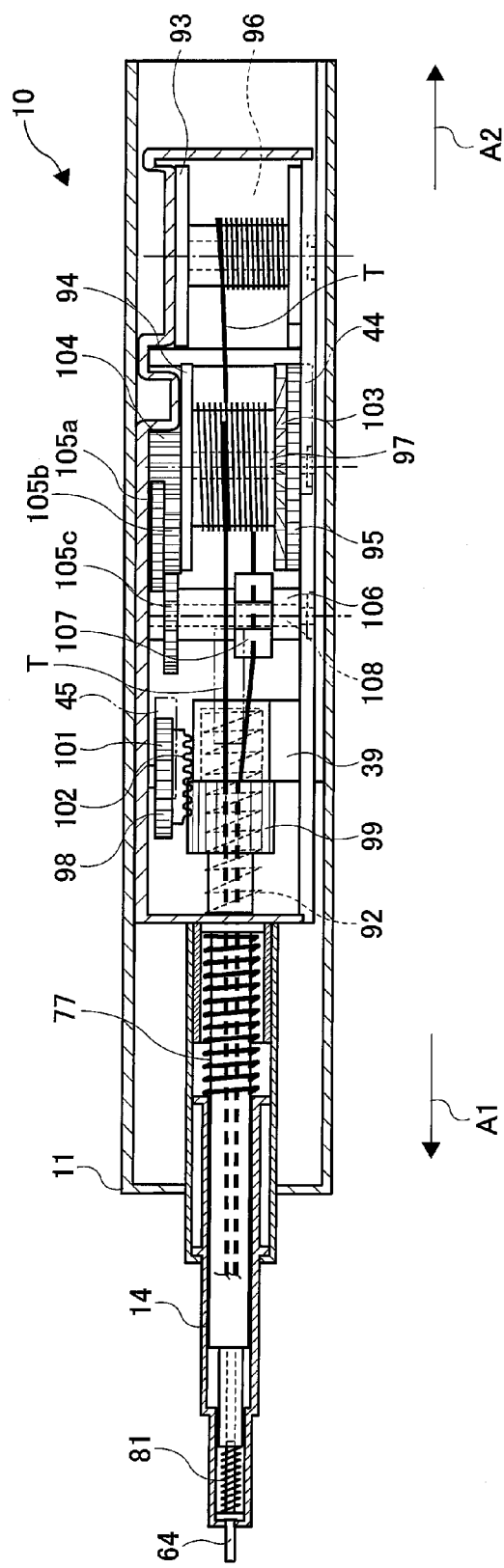
FIG. 13 is a top view of the optical fiber connector cleaner.
Figure 14:
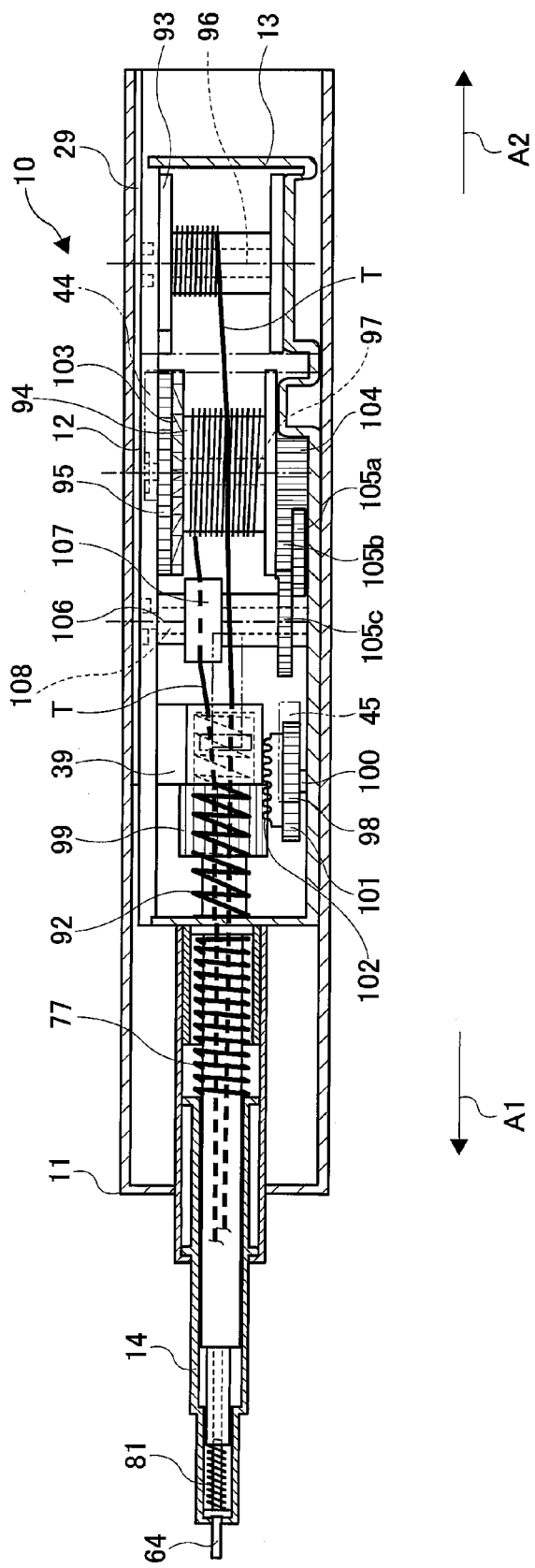
FIG. 14 is a bottom view of the optical fiber connector cleaner.
Figure 15:
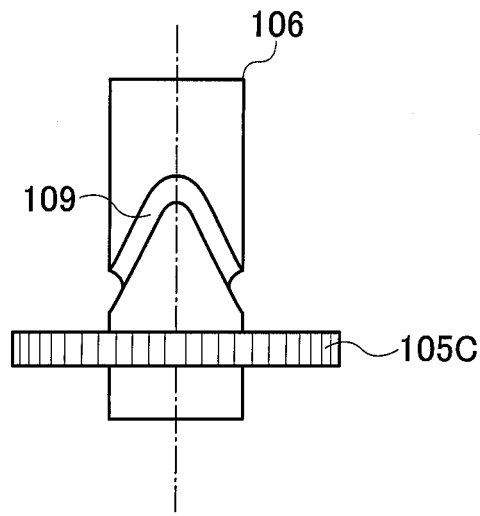
FIG. 15 is a view showing an example of a guide groove formed in the rotation shaft.
Figure 16:
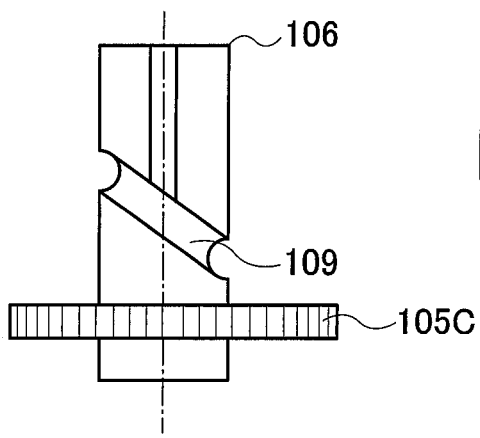
FIG. 16 is a view showing an example of the guide groove formed in the rotation shaft.
Figure 17:
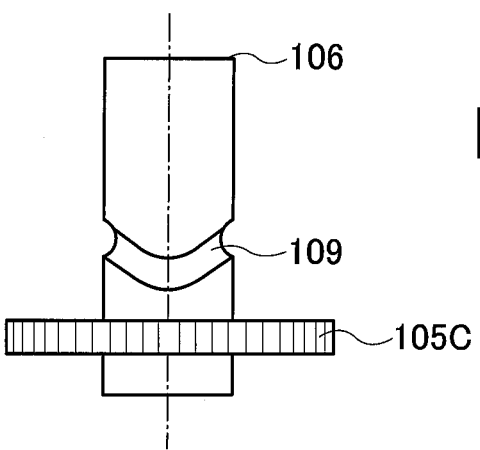
FIG. 17 is a view showing an example of the guide groove formed in the rotation shaft.
Figure 18:
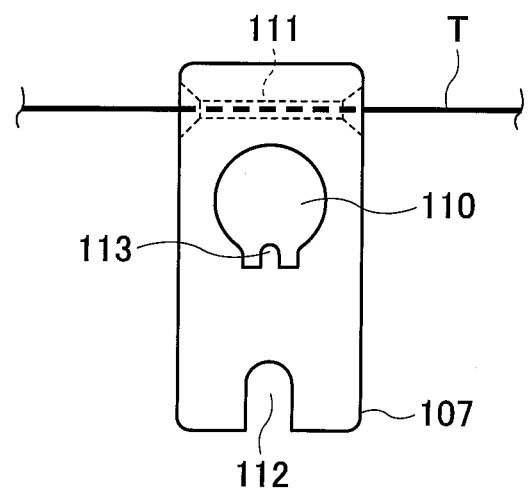
FIG. 18 is a front view of an example of a moving block.

FIG. 12 is a side view of the optical fiber connector cleaner 10, FIG. 13 is a top view of the optical fiber connector cleaner 10. and FIG. 14 is a bottom view of the optical fiber connector cleaner 10. FIGS. 15 through 17 are diagrams of an example of a guide groove 109 formed on the rotation shaft 106, and FIG. 18 is a front view of a moving block 107 shown as an example. In FIGS. 12 through 14, the forward direction in the one direction is indicated by an arrow A1, the backward direction in the one direction is indicated by an arrow A2. In FIGS. 12 through 14, a state in which the fixing member 12 and the second casing 13 are installed in the first casing 11, and a cleaning shaft 14 is mounted is shown. When the fixing member 12 and the second casing 13 are installed in the first casing 11, a guide bar 116 of the second casing 13 to be inserted is inserted to the guide slit 42 of the fixing member 12. When the second casing 13 is moved forward and backward in the one direction, the guide bars 116 is inserted and engaged in the guide slit 42.

In FIG. 12, a state in which the side wall 17 of the first casing 11 is cut, the first contact plate 29 in the fixing member 12 is omitted, and the rack gear 44 and the engagement plate 43 are shown, and the fixing pipe 61 is cut is illustrated. In FIG. 13, a state in which the top walls 15 and 49 of the first and second casings 11 and 13, and the first contact plate 29 in the fixing member 12 are omitted, and the fixing pipe 61 is cut is illustrated. In FIG. 14, a state in which the bottom walls 16 and 50 of the first and second casings 11 and 13 are omitted, and the fixing pipe 61 is cut is illustrated.

In FIGS. 12 through 14, the second casing 13 is moved backward in one direction relative to the first casing 11 by the bias force of the coil spring 92, the second fixing pipe 61B is moved forward in one direction relative to the first fixing pipe 61A by the bias force of the coil spring 77, and the tape support shaft 64 is moved forward in the one direction relative to the guide pipe 62 by the bias force of the coil spring 81.

The optical fiber connector cleaner 10 includes a forwarding and reversing mechanism to move the second casing 13 forward and backward in the one direction in the first casing 11, a winding mechanism to send the cleaning tape T from the supply reel 93 to be described later toward the cleaning shaft 14 and wind the tape T returned from the shaft to the winding reel 94 to be described later, a rotation mechanism to rotate the cleaning shaft in the normal and reverse directions about the axis (clockwise and counterclockwise directions), a ratchet mechanism to rotate the winding reel 94 only to the winding direction of the cleaning tape T, and a guide mechanism to move the tape T from one side of the outer circumferential surface of the reel 94 toward the other side thereof and move the tape T from the other side thereof toward the one side thereof.

The forwarding and reversing mechanism is formed of the fixing member 12, and a coil spring 92 (first biasing means). The base end portion of the coil spring 92 is contained in the containing recess 41 of the fixing member 12, the distal end thereof is supported by a spring support protrusion 59 of the second casing 13. The second casing 13 is biased backward in the one direction relative to the first casing 11 (fixing member 12) by bias force of the coil spring 92 (elasticity), the first casing 11 (fixing member 12) is biased forward in the one direction relative to the second casing 13. Further, the rear end of the engagement plate 43 of the fixing member 12 contacts the step portion 60 of the second casing 13, accordingly, it is prevented that the second casing 13 moves backward in the one direction.

The winding mechanism is formed of a supply reel 93 and a winding reel 94 disposed in the containing space 55 (inside) of the second casing 13, a rack gear 44 (second rack gear) disposed in the fixing member 12, and a gear 95 (third gear) to rotate the winding reel 94. The supply reel 93, the winding reel 94 and the gear 95 are made of plastic.

The supply reel 93 is disposed in the space 55 of the rear wall 54 side and is rotatably supported with the shaft 96 (inserted). In the supply reel 93, the cleaning tape T is wound. The winding reel 94 is disposed at the substantially center of the space 55, and is rotatably supported (inserted) with the shaft 97. The winding reel 94 winds the cleaning tape T fed from the supply reel 93. The gear 95 is disposed between the winding reel 94 and the side wall 52 of the second casing 13, and is rotatably supported (inserted) with the shaft 97.

The rotation mechanism is formed of a rack gear 45 (first rack gear) disposed on the fixing member 12, a gear 98 (first gear) disposed in the containing space 55 (inside) of the second casing 13, and a gear 99 (second gear) connected to the connection shaft 76 (base end portion of the cleaning shaft 14) of the second pipe 74. The gear 98 and gear 99 are made of plastic. The gear 98 is disposed in the space 55 at the front wall 53 side, and is rotatably supported (inserted) with the shaft 100. The gear 98 includes first teeth 101 to be fitted to the rack gear 45, and second teeth 102 to be fitted to the gear 99.

The ratchet mechanism is formed of a gear 95 (third gear) and a fastening gear 103 which is fitted to the gear 95. The fastening gear 103 is made of plastic. The fastening gear 103 is disposed between the winding reel 94 and the gear 95. The fastening gear 103 is molded integrally with the winding reel 94, and is rotatably supported (inserted) with the shaft 97 together with the reel 94. The ratchet mechanism prevents the gear 95 from rotating when the rack gear 44 is moved forward in the one direction, so that the rotation of the winding reel 94 to the feeding direction of the cleaning tape T is prevented.

The guide mechanism is formed of a gear 104 (fourth gear) disposed in the containing space 55 (inside) of the second casing, three gears 105a through 105c (fifth to seventh gears) disposed in the containing space 55 (inside)

of the second casing, a rotation shaft 106 extending from the gear 105c, and the moving block 107 inserted through the rotation shaft 106. The gear 104, gears 105a through 105c, the rotation shaft 106, and the moving block 107 are made of plastic. The gear 104 is disposed between the winding reel 94 and the side wall 51 of the second casing. The gear 104 is molded integrally with the winding reel 94, and is rotatably supported (inserted) with the shaft 97 together with the reel 94. The gear 104 is rotated in conjunction with the gear 95. The rotation shaft 106 is rotatably supported (inserted) with the shaft 108.

The gear 105a is provided immediately before the gear 104 and is rotatably supported (inserted) with a shaft (not shown). The gear 105a is fitted to the gear 104. The gear 105b is disposed between the winding reel 94 and the gear 105a. The gear 105b is molded integrally with the gear 105a, and is rotatably supported (inserted) with a shaft (not shown). The gear 105c is provided immediately before the gear 105b. The gear 105c is molded integrally with the rotation shaft 106, and is rotatably supported (inserted) with the rotation shaft 107 together with the rotation shaft 106. The gear 105c is fitted to the gear 105b. These gears 105a through 105c form a speed reduced gear train which slows the rotational speed of the rotation shaft 106 down to slower than that of the winding reel 94.

On the circumferential surface of the rotation shaft 106, as shown in FIGS. 15 through 17, a guide groove 109 extending and bending to a direction in which the circumferential surface is rounding is formed. The moving block 107 is a six-sided body of substantially rectangular pillar shape. As shown in FIG. 18, the moving block 107 includes an insertion hole 110 to insert the rotation shaft 106, a tape insertion hole 111 for inserting the cleaning tape, and a guide recess 112 (regulation groove) for restricting the movement of the moving block 107. In the insertion hole 110, a guide protrusion 113 to be engaged with the guide groove 109 of the rotation shaft 106 is formed. The guide recess 112 is inserted into and engaged with the guide rail 114 formed on the bottom wall 49 of the second casing 13 and extending in the horizontal direction.

Figure 21:
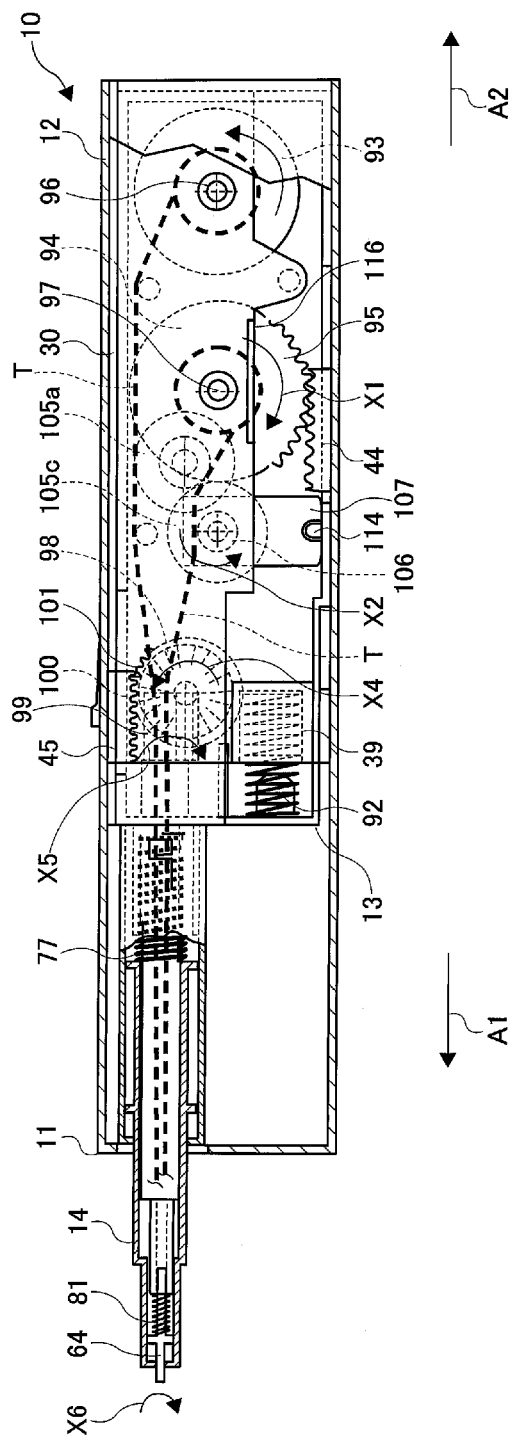
FIG. 21 is a side view of the optical fiber connector cleaner.
Figure 22:
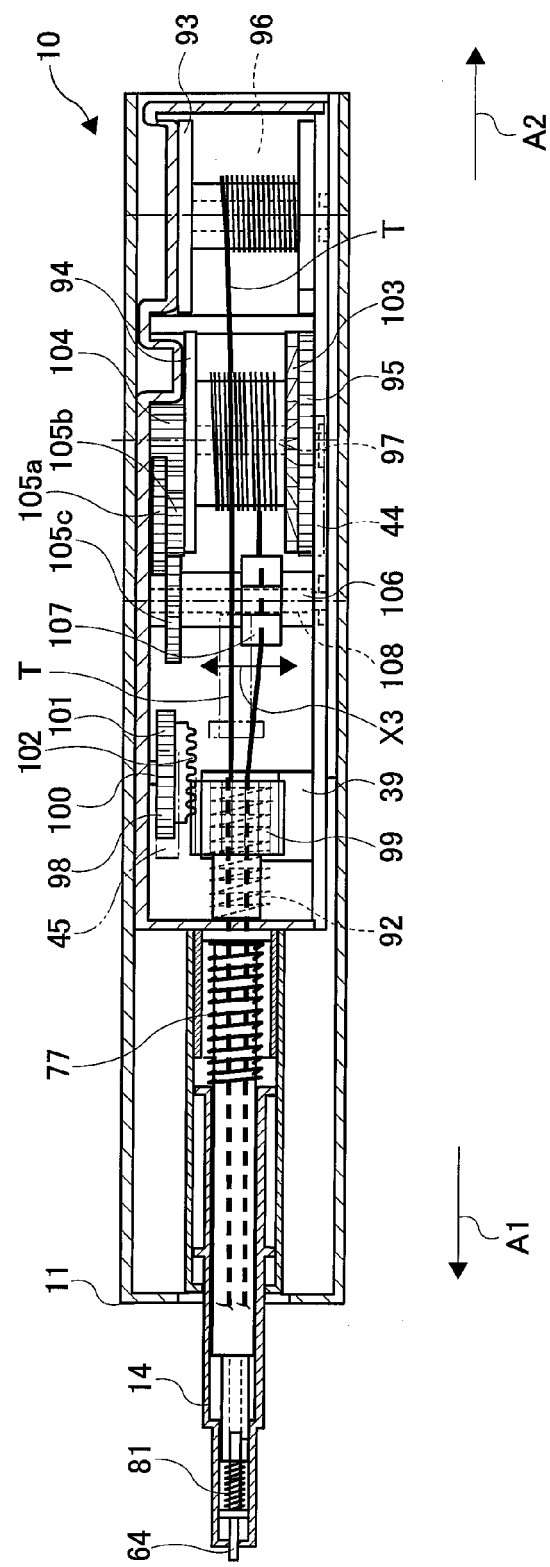
FIG. 22 is a top view of the optical fiber connector cleaner.
Figure 23:
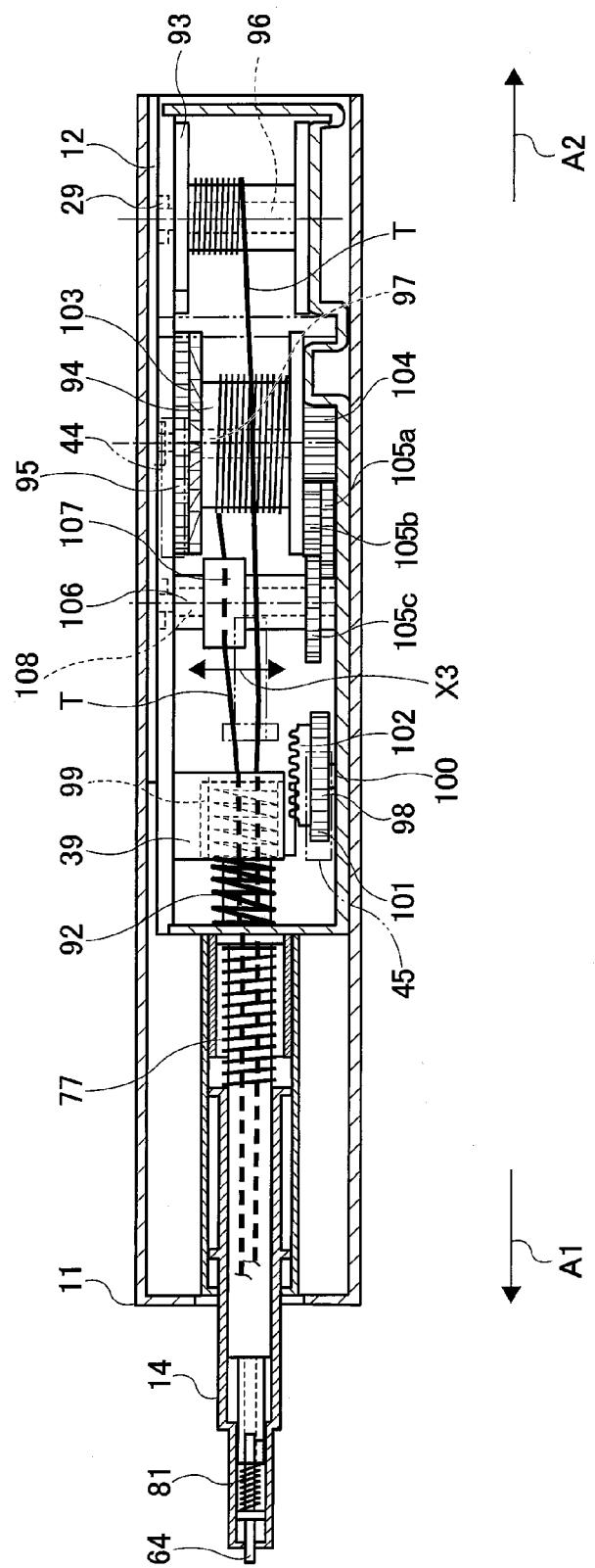
FIG. 23 is a bottom view of the optical fiber connector cleaner.

FIG. 19 is a schematic to explain an example procedure for cleaning the end surface of the optical fiber connector 115, FIG. 20 is a schematic to explain the procedure which follows from FIG. 19. FIG. 21 is a side view of the optical fiber connector 10, FIG. 22 is a top view of the optical fiber connector cleaner 10, FIG. 23 is a bottom view of the optical fiber connector cleaner 10. In FIGS. 21 through 23, the forward direction in the one direction is indicated by an arrow A1, and the backward direction in the one direction is indicated by an arrow A2.

In FIG. 21, a state in which the side wall 17 of the first casing 11 is cut, the first contact plate 29 in the fixing member 12 is omitted, and the rack gear 44 is shown, and the fixing pipe 61 is cut is illustrated. In FIG. 22, a state in which the top walls 15 and 49 of the first and second casings 11 and 13, and the first contact plate 29 in the fixing member 12 are omitted, and the fixing pipe 61 is cut is illustrated. In FIG. 23, a state in which the bottom walls 16 and 50 of the first and second casings 11 and 13 are omitted, the fixing pipe 61 is cut is illustrated.

In FIGS. 21 through 23, the second casing 13 is moved forward in the one direction relative to the first casing 11 against the bias force of the coil spring 92, a second fixing pipe 61B is moved backward in the one direction relative to the first fixing pipe 61A against the bias force of the coil spring 77, the tape support shaft 64 is moved backward in the one direction relative to the guide pipe 62 against the bias force of the coil spring 81.

When the optical fiber connector 115 is disconnected and the cleaning of the end surface (ferrule end face) (not shown) of the connector 115 is performed using the optical fiber connector cleaner 10, the cap 27 is removed from the distal end portion of the cleaning shaft 14 (tape support shaft 64) so that the tape support shaft 64 is exposed, as shown in FIGS. 19 and 20, the distal end portion of the cleaning shaft 14 (tape support shaft 64) is inserted into the connector 115. When the distal end portion of the cleaning shaft 14 is inserted into the connector 115, it is not shown, however, the distal end portion 86 of the exposing shaft 79 of the tape support shaft 64 contacts the end surface of the connector 115.

The optical fiber connector cleaner 10 is pressed forward in the one direction toward the connector 115 in a state in which the distal end portion of the cleaning shaft 14 (tape support shaft 64) is inserted into the optical fiber connector 115 (the distal end portion 86 of the exposing shaft 79 is in contact with the end surface of the connector 115). When the optical fiber connector cleaner 10 is pressed forward in the one direction, a pressing force for pressing the tape support shaft 64 backward in the one direction is applied on the support shaft 64, the support shaft 64 is moved backward in the one direction against the bias force of the coil spring 81, and a pressing force for pressing the second fixing pipe 61B backward in the one direction is applied to the pipe 61B, the pipe 61B is moved backward in the one direction against the bias force of the coil spring 77. Further, a pressing force for pressing the second casing 13 backward in the one direction is applied to the casing 13, and the casing 13 is moved backward in the one direction by the bias force of the coil spring 92. (forwarding and reversing mechanism)

In the optical fiber connector cleaner 10, when the second casing 13 is moved backward in the one direction relative to the first casing 11 (fixing member 12), the rack gear 44 (second rack gear) disposed on the fixing member 12 is moved forward in the one direction, a gear 95 fitted to the rack gear 44 (third gear) is rotated in the winding direction shown by the arrow X1 in FIG. 21. When the gear 95 is rotated in the winding direction, the winding reel 94 is rotated in the winding direction thereby, and the gear 104 (fourth gear) is rotated in the winding direction.

By the rotation of the winding reel 94 in the winding direction, the cleaning tape T is wound around the circumferential surface of the reel 94, thereby, the tape T is fed from the supply reel 93 (winding mechanism). When the gear 104 is rotated in the winding direction, the gear 105a (fifth gear) fitted to the gear 104 is rotated, the gear 105b (sixth gear) fitted to the gear 105a is rotated, and the gear 105c (seventh gear) fitted to the gear 105b is rotated.

In the optical fiber connector cleaner 10, by utilizing the rack gear 44 and a gear 95 fitted thereto, the forwarding and reversing mechanism works with the winding mechanism, accordingly, only by the operation in which the second casing 13 is moved forward and backward in the one direction in the first casing 11, it is possible to feed the cleaning tape T reliably toward the distal end portion 86 of the exposing shaft 79 of the tape support shaft 64.

When the gear 105c is rotated, the rotation shaft 106 is rotated toward a direction indicated by the arrow X2 in FIG. 21 thereby. When the rotation shaft 106 is rotated, the guide protrusion 113 of the moving block 107 engaged with the guide groove 109 of the circumferential surface of the rotation shaft 106 is moved in the guide groove 109, thereby, the moving block 107 is moved back and forth in the direction indicated by the arrow X3 in FIGS. 22 and 23 along the guide rail 114, while the cleaning tape T inserted through the tape insertion hole 111 of the moving block 107 is reciprocating in the direction indicated by the arrow X3 on the circumferential surface of the winding reel 94, the cleaning tape T is wound on the circumferential surface of the reel 94 (guide mechanism).

In the optical fiber connector cleaner 10, by engaging the guide recess 112 of the moving block 107 with the guide rail 114 of the second casing 13, the engagement between the guide protrusion 113 and the guide groove 109 is never released, by the rotation of the rotary shaft 106, the moving block 107 having a guide protrusion 113 which engages with the guide groove 109 reciprocates between the one side and the other side of the rotation shaft 106 (between two side edge portions) reliably.

When the cleaning tape T is wound in the winding reel 94, if the tape T is wound in a specific one place of the outer circumferential surface of the reel 94, the tape T is deviated thereto so that the bulk of the tape T is increased only in that location, the winding of the tape T in the reel 94 becomes in a saturated condition in a short time, accordingly, it is not possible to wind the tape T up sufficiently, therefore, it is not possible to hold the tape T in the optical fiber connector cleaner 10 sufficiently. However, in this optical fiber connector cleaner 10, since the tape T is wound in the reel 94 while the tape T is moving on the outer circumferential surface of the reel 94 in the direction shown by the arrow X3 by the guide mechanism, the winding area of the tape T is not deviated, but the tape T is wound over the entire area of the reel 94, accordingly, it is possible to hold sufficient amount of tape T in the optical fiber connector cleaner 10, consequently, it is possible to use the optical fiber connector cleaner 10 continuously for a long term.

In the optical fiber connector cleaner 10, gears 105*a* through 105*c* are formed of a speed reduced gear train, the rotation speed of the rotation shaft 106 is decelerated to slower than that of the gear 104, the cleaning tape T is wound to the winding reel 94 in a state in which the rotation speed of the rotation shaft 106 is reduced, accordingly, even when the tape T is moved between the one side and the other side of the outer circumferential surface of the reel 94 by the guide mechanism, the tape T is not entangled, therefore, it is possible to prevent non-delivery of the tape T due to the tangling of the tape T.

When the second casing 13 is moved backward in the one direction relative to the first casing 11 (fixing member 12), the rack gear 45 disposed on the fixing member 12 (first rack gear) is moved forward in the one direction, the gear 98 (first gear) fitted to the rack gear 45 via the first teeth 101 is rotated in the direction indicated by the arrow X4 in FIG. 21. When the gear 98 is rotated in the direction indicated by the arrow X4, thereby, a gear 99 (second gear) fitted to the teeth 102 of the second gear 98 is rotated in the direction indicated by an arrow X5 in FIG. 21. When the gear 99 is rotated in the direction indicated by the arrow X5, while the guide pipe 62 connected to the gear 99 is rotated in the direction of arrow X5 thereby, the tape support shaft 64 inserted into the pipe 62 is rotated in the direction indicated by arrow X6 in FIGS. 10 and 21 (rotation mechanism). Further, in the rotation mechanism, the gear ratio between the gear 98 and gear 99 is determined so that the rotation angle of the support shaft 64 from the starting point of the rotation of the tape support shaft 64 (guide pipe 62) to the end point thereof becomes 180°.

When the tape T is fed from the supply reel 93 by winding the cleaning tape T to the winding reel 94, the tape T passes through the containing space 55 of the second casing 13 from the reel 93, the tape T enters the tape forward path of the guide pipe 62 (the first pipe 73 and the second pipe 74) from the space 55, passes through the tape forward path and enters the tape forward path 84 of the tape support shaft 64 (the insertion shaft 78 and the exposing shaft 79). The cleaning tape T is moved forward in the one direction shown by arrow X7 in FIG. 9 in the tape forward 84 of the tape support shaft 64, is moved further toward the distal end of the support shaft 64 (distal end portion 86 of the exposing shaft 79).

The cleaning tape T enters the tape flow through hole 87 from the tape forward path 84, passes through the tape flow through hole 87 and is exposed out of the distal end of the support shaft 64 (distal end portion 86 of the exposing shaft 79) from the distal end opening 88 of the exposing shaft 79. The cleaning tape T exposed from the distal end opening 88 moves further to the distal end sliding surface 89 of the distal end portion 86 of the exposing shaft 79 from the opening 88. The distal end sliding surface 89 is in contact with the end surface of the optical fiber connector, dirt such as oil and dust adhered to the end surface is wiped off by the cleaning tape T sliding (move) on the distal end sliding surface 89. Further, the tape support shaft 64 (the insertion shaft 78 and exposing shaft 79) is rotated in the direction shown by the arrow X6 in FIGS. 10 and 21 in synchronization with the movement of the cleaning tape T, accordingly, rotational movement is added to the shifting movement of the tape T, consequently, it is possible to wipe the dirt on the end surface off reliably by the tape T.

After the cleaning tape T which slides (move) on the distal end sliding surface 89 enters the distal end guide surface 90 of the exposing shaft 79 from the distal end sliding surface 89, the tape T moves backward in the one direction indicated by the arrow X8 in FIG. 9 in the tape return path 85 of the tape support shaft 64, and enters the tape return path of the guide pipe 62 (the first pipe 73 and the second pipe 74). The cleaning tape T passes through the containing space 55 of the second casing 13 from the tape return path of the guide pipe 62, further, passes through the tape insertion hole 111 of the moving block 107, while the tape reciprocates in the direction indicated by the arrow X3, the tape is wound on the circumferential surface of the winding reel 94.

Next, after the optical fiber connector cleaner 10 is pushed toward the optical fiber connector 115 forward in the one direction, when the pressure is released from that state, the bias force of the coil spring 81 is applied on the tape support shaft 64 so that the support shaft 64 is moved forward in the one direction by the bias force of the coil spring 81, the bias force of the coil spring 77 is applied on the second fixing pipe 61B, the pipe 61B is moved forward in the one direction by the bias force of the spring 77. Further, the bias force of the coil spring 92 is applied on the second casing 13 so that the casing 13 is moved forward in the one direction by the bias force of the coil spring 92. (forwarding and reversing mechanism)

When the second casing 13 is moved forward in the one direction relative to the first casing 11 (fixing member 12), the rack gear 44 (second rack gear) disposed on the fixing member 12 is moved backward in the one direction, a force to rotate the gear 95 (third gear) fitted to the rack gear 44 is applied to the gear 95. However, by the fastening gear 103 which form a ratchet mechanism, the rotation of the gear 95 to the direction to which the tape is fed (in the winding direction indicated by the arrow X1 in FIG. 21) is blocked, so that the feeding of the cleaning tape T from the winding reel 94 (reverse movement) is prevented.

In the optical fiber connector cleaner 10, even when the second casing 13 is moved forward in the one direction in the first casing 11 and the rack gear 44 is moved forward in the one direction thereby, the rotation of the gear 95 is blocked by the fastening gear 103 of the ratchet mechanism, so that it is possible to prevent the cleaning tape T wound in the winding reel 94 from being fed (reverse movement) from the reel 94.

When the second casing 13 is moved forward in the one direction relative to the first casing 11 (fixing member 12), the rack gear 45 disposed on the fixing member 12 (first rack gear) is moved backward in the one direction, and the gear 98 (first gear) fitted to the rack gear 45 via the first teeth 101 is rotated in the direction indicated by an arrow X9 in FIG. 12. When the gear 98 is rotated in the direction indicated by the arrow X9, the gear 99 (second gear) fitted to the teeth 102 of the second gear 98 is rotated in the direction indicated by an arrow X10 in FIG. 12. When the gear 99 is rotated in the direction indicated by an arrow X10, while the guide pipe 62 connected to the gear 99 is rotated in the direction of arrow X10, the tape support shaft 64 inserted into the pipe 62 is rotated in the direction indicated by an arrow X11 in FIGS. 10 and 12 (rotation mechanism). The tape support shaft 64 (guide pipe 62) is rotated by 180° reversely to a case in which the optical fiber connector cleaner 10 is pressed forward in the one direction toward the connector 115, then, returns to the starting point of the rotation from the end point of the rotation.

In the optical fiber connector cleaner 10, the rack gear 45 is moved forward and backward in the one direction in accordance with the forward and backward movement of the second casing 13 in the one direction, and the gear 98 fitted to the rack gear 45 via the first teeth 101 is rotated, while the gear 99 fitted to the second teeth 102 is rotated by the rotation of the gear 98, the tape support shaft 64 (guide pipe 62) connected to the gear 99 is rotated in the normal and reverse directions, accordingly, with the forwarding and reversing mechanism, by moving the second casing 13 forward and backward in the one direction in the first casing 11, it is possible to rotate the tape support shaft 64 in the normal and reverse directions about the axis of the tape support shaft 64 (the guide pipe 62) reliably.

After removing the pressing force, when the optical fiber connector cleaner 10 is pressed again forward in the one direction toward the connector 115, the second casing 13 is moved backward in the one direction against the bias force of the coil spring 92 (forwarding and reversing mechanism), the gear 95 (third gear) fitted to the rack gear 44 is rotated in the winding direction (the direction of the arrow X1), and the winding reel 94 is rotated in the winding direction, the cleaning tape T is wound around the circumferential surface of the winding reel 94, so that the tape T is fed from the supply reel 93 thereby again (winding mechanism).

Further, the gear 104 (fourth gear) is rotated in the winding direction, the gear 105a (fifth gear) fitted to the gear 104 is rotated, the gear 105b (sixth gear) fitted to the gear 105a is rotated, the gear 105c (seventh gear) fitted to the gear 105b is rotated. The shaft 106 is rotated in the direction of the arrow X2 by the rotation of the gear 105c, the moving block 107 is reciprocated in the direction of the arrow X3, and while the cleaning tape T is reciprocated in the direction of the arrow X3 on the circumferential surface of the winding reel 94, the cleaning tape T is wound in the circumferential surface of the reel 94 (guide mechanism).

The gear 98 (First gear) fitted to the rack gear 45 via the first teeth 101 is rotated in the direction of the arrow X4, the gear 99 (Second gear) fitted to the second teeth 102 of the gear 98 is rotated in the direction of the arrow X5, and while the guide pipe 62 is rotated in the direction of the arrow X5, the tape support shaft 64 is rotated in the direction of the arrow X6 (rotation mechanism). When the tape T is fed from the supply reel 93 by winding the cleaning tape T to the winding reel 94, while the tape support shaft 64 is rotated in the direction of the arrow X6, the cleaning tape T exposed from the distal end opening 88 of the shaft 79 slides (move) on the distal end sliding surface 89 so that dirt such as oil and dust adhered to the end surface is wiped by the tape T. The cleaning tape T is moved backward in the one direction (direction of arrow X8) in the tape return path 85 of the tape support shaft 64, passes through the tape return path of the guide pipe 62, the containing space 55 of the second casing 13, and the tape insertion hole 111 of the moving block 107, while the tape is reciprocated in the direction of the arrow X3, the tape is wound on the circumferential surface of the winding reel 94.

After the optical fiber connector cleaner 10 is pressed forward in the one direction toward the optical fiber connector 115, when the pressure is released from that state, the casing 13 is moved forward in the one direction by the bias force of the coil spring 92 (forwarding and reversing mechanism), the rack gear 44 (second rack gear) is moved backward in the one direction, however, the rotation of the gear 95 in the direction in which the tape is feeding is prevented by the fastening gear 103 of the ratchet mechanism.

When the second casing 13 is moved forward in the one direction, the rack gear 45 (first rack gear) is moved backward in the one direction, the gear 98 (first gear) fitted to the rack gear 45 via the first teeth 101 is rotated in the direction of arrow X9, the gear 99 (second gear) fitted to the second teeth 102 of the gear 98 is rotated in the direction of arrow X10, and while the guide pipe 62 is rotated to the direction of the arrow X10, the tape support shaft 64 is rotated in the direction of the arrow X11 (rotation mechanism).

In the optical fiber connector cleaner 10, in a state in which the distal end portion of the cleaning shaft 14 (tape support shaft 64) is inserted in the optical fiber connector 115, when a pressing operation to press the optical fiber connector cleaner 10 forward in the one direction toward the connector 115 is performed, the forwarding and reversing mechanism, the winding mechanism, the rotation mechanism, and the guide mechanism are activated, when a release operation to remove the pressure is performed, the forwarding and reversing mechanism, the rotation mechanism, and the ratchet mechanism are activated. In the optical fiber connector cleaner 10, by repeating the pressing operation and the release operation, the cleaning tape T is fed intermittently from the supply reel 93, by the cleaning tape T moving on the distal end sliding surface 89 and the rotation of the tape support shaft 64 being rotated in synchronizing with the movement of the tape T, it is carried out to clean the end surface of the connector 115. When the cleaning operation of the end and surface of the connector 115 has been completed, the distal end of the cleaning shaft 14 is pulled out from the connector 115, and the cap 27 is attached to the distal end of the cleaning shaft 14 (distal end 86 of the exposing shaft 79 of the tape support shaft 64).

In the optical fiber connector cleaner 10, when the distal end portion of the cleaning shaft 14 is inserted into the optical fiber connector 115, and the second casing 13 is moved backward in the one direction, the cleaning shaft 14 (the guide pipe 62 and tape support shaft 64) is rotated about the axis in synchronization with the feeding of the cleaning tape T, accordingly, it is possible to simultaneously perform a feeding operation of the tape T and a rotation of the shaft 14, thus, while the tape T is being moved and rotated, it is possible to make the tape T to contact the end surface of the connector 115.

In the optical fiber connector cleaner 10, it is possible to perform the cleaning operation of the end surface of the connector 115 easily, further, since the shaft 14 is rotated in both the normal and reverse directions, accordingly, the feeding operation of the cleaning tape T is linked to the rotational movement of the shaft 14, so that the feeding of the tape T and the rotation of the tape T are performed simultaneously, accordingly, it is possible to perform the cleaning operation of the end surface of the connector 115 accurately by the rotation of the tape T and the feeding of the tape T, consequently, it is possible to wipe the dirt of the end surface off reliably.

In the optical fiber connector cleaner 10, since the cleaning tape T is a strip of cloth made of ultrafine fibers, accordingly, using the tape T which is aggregation of ultrafine fibers, it is possible to collect the dirt adhered on the end surface of the optical fiber connector 115 by the ultrafine fibers, consequently, it is possible to wipe the dirt of the end surface off reliably.

In the optical fiber connector cleaner 10, when the distal end portion of the cleaning shaft 14 is inserted into the optical fiber connector 115, and the second casing 13 is moved backward in the one direction against the bias force of the coil spring 92, the tape support shaft 64 contacts the end surface of the connector 115 at a predetermined pressing force, however, when an excess pressing force greater than necessary is applied to the end surface of the connector 115, the guide pipe 62 (Second pipe 74) is moved backward in the one direction against the bias force of the coil spring 77, and the tape support shaft 64 is moved backward in the one direction against the bias force of the coil spring 81, accordingly, it is possible to reduce the pressing force applied to the end surface, therefore, it is possible to press the tape support shaft 64 onto the end surface at an appropriate pressure. Thus, in the optical fiber connector cleaner 10, an excess pressing force greater than necessary is not applied to the end surface of the connector 115, consequently, it is possible to wipe the dirt on the end surface off without damaging the end surface of the connector 115.

In the optical fiber connector cleaner 10, after the cleaning tape T which is moved in the tape forward path 84 of the tape supporting shaft 64 is exposed to the outside of the support shaft 64 from the distal end opening 88 of the support shaft 64, the tape T slides on the distal end sliding surface 89 of the support shaft 64, passes through the distal end guide surface 90, and returns to the tape return path 85, accordingly, it is possible to prevent the tape T from falling off from the distal end portion 86 of the tape support shaft 64, consequently, it is possible to clean the end surface of the connector 115 reliably while performing the feeding of the tape T and the rotation of the tape T.

What is claimed is:

1. An optical fiber connector cleaner which cleans an end surface of an optical fiber connector using cleaning tape, comprising:
    a first casing which is longer in one direction relative to the other direction;
    a second casing provided in the first casing;
    a cleaning shaft extending forward in the one direction from the second casing to be exposed from the first casing;
    a cleaning tape;
    a supply reel in which the cleaning tape is wound;
    a winding reel to wind the cleaning tape from the supply reel;
wherein, the optical fiber connector cleaner further comprising:
    a forwarding and reversing mechanism to move the second casing forward and backward in the one direction in the first casing, including
        a fixing member which is provided at a predetermined position in the first casing and with which the second casing is in contact so as to be slidable, and
        a first biasing means to bias the second casing forward in the one direction relative to the fixing member;
    a winding mechanism to feed the cleaning tape from the supply reel toward the cleaning shaft in response to a backward movement of the second casing in the one direction and wind the cleaning tape returned from the cleaning shaft to the winding reel; and
    a rotation mechanism to rotate the cleaning shaft about an axis thereof in synchronization with a feeding of the cleaning tape in accordance with the backward movement of the second casing in the one direction, including
        a first rack gear disposed on the fixing member and extending in the one direction,
        a first gear rotatably mounted in the second casing and having first teeth fitted to the first rack gear, and second teeth fitted to a second gear, and
        the second gear coupled to a base end of the cleaning shaft.

2. The optical fiber connector cleaner according to claim 1,
    wherein in the forwarding and reversing mechanism,
    the second casing is moved backward in the one direction against the first biasing means when a pressing force to move the cleaning shaft backward in the one direction is applied, and the second casing is moved forward in the one direction by the first biasing means when the pressing force is removed; and
        in the rotation mechanism, the first rack gear is moved forward and backward in the one direction in accordance with the forward and backward movement of the second casing in the one direction, and the first gear fitted to the first rack gear via the first teeth is rotated, while the second gear fitted to the second teeth is rotated by the rotation of the first gear, the cleaning shaft connected to the second gear is rotated in normal and reverse directions.

3. The optical fiber connector cleaner according to claim 2,
    wherein the winding mechanism is formed of a second rack gear provided on the fixing member and extending in the one direction, and a third gear fitted to the second rack gear and mounted rotatably in the second casing to rotate the winding reel, and
        in the winding mechanism, the second rack gear is moved forward in the one direction in response to the backward movement of the second casing in the one direction, and the winding reel is rotated in the winding direction of the cleaning tape while the third gear fitted to the second rack gear is rotated.

4. The optical fiber connector cleaner according to claim 3,
    wherein the third gear includes a ratchet mechanism which rotates the winding reel only to the winding direction of the cleaning tape, and
        in the optical fiber connector cleaner, the rotation of the third gear is prevented by the ratchet mechanism when the second rack gear is moved forward in the one direction in accordance with the forward movement of the second casing in the one direction.

5. The optical fiber connector cleaner according to claim 4,
wherein the optical fiber connector cleaner includes a guide mechanism which moves the cleaning tape from one side of an outer circumferential surface of the winding reel towards the other side thereof and moves the cleaning tape from the other side thereof toward the one side thereof when the cleaning tape is wound in the winding reel.

6. The optical fiber connector cleaner according to claim 5,
wherein the guide mechanism includes:
a fourth gear rotatably mounted in the second casing and being rotated in conjunction with the third gear;
a fifth gear rotatably mounted in the second casing and fitted to the fourth gear;
a sixth gear rotatably mounted in the second casing and fitted to the fifth gear;
a seventh gear rotatably mounted in the second casing and fitted to the sixth gear;
a rotation shaft provided at a forward position of the winding reel in the one direction and extending from the seventh gear; and
a moving block inserted into the rotation shaft and reciprocating between two side edge portions of the rotation shaft,
and wherein the rotation shaft includes a guide groove being bent to a rounding direction around the circumference surface thereof and extending,
and wherein the moving block includes an insertion hole to which the rotation shaft is inserted,
an engagement protrusion which extends inwardly in a radial direction of the insertion hole to engage with the guide groove, and
a tape insertion hole passing through the moving block and extending in the one direction.

7. The optical fiber connector cleaner according to claim 6,
wherein the moving block includes a guide recess extending in the radial direction of the insertion hole, and the guide recess is inserted into and engaged with a guide rail of the second casing extending in the axial direction of the rotation shaft.

8. The optical fiber connector cleaner according to claim 7,
wherein the fifth to seventh gears are formed of a speed reduced gear train.

9. The optical fiber connector cleaner according to claim 3,
wherein the optical fiber connector cleaner includes a position fixing mechanism to fix the installation position of the second casing in the first casing by moving the second casing forward and backward in the one direction, and
in the optical fiber connector cleaner, it is possible to change an exposed length of the cleaning shaft from the first casing by changing the installation position of the second casing in the first casing by the position fixing mechanism.

10. The optical fiber connector cleaner according to claim 9,
wherein the position fixing mechanism includes a guide portion provided in the first casing and extending in the one direction, and a stopper portion provided on the fixing member to move on the guide portion forward and backward in the one direction to be engaged and fixed at a predetermined position of the guide portion.

11. The optical fiber connector cleaner according to claim 3,
wherein the cleaning shaft includes a fixing pipe fixed in the second casing and extending in the one direction, a guide pipe which is inserted rotatably into the fixing pipe so as to be moved forward and backward in the one direction, and in which a base portion thereof is connected to the rotation mechanism, and a tape support shaft which is connected rotatably to the distal end portion of the guide pipe and movable in the one direction to form the distal end portion of the shaft, and the guide pipe is biased to the fixing pipe via a second biasing means forward in the one direction, and the tape support shaft is biased to the guide pipe via a third biasing means forward in the one direction.

12. The optical fiber connector cleaner according to claim 11,
wherein in the distal end portion of the tape support shaft, a distal end opening being open in the one direction to expose the cleaning tape being moved in a tape forward path to the outside of the tape support shaft, a distal end sliding surface extending in a radial direction of the cleaning shaft from the distal end opening, on which the cleaning tape fed from the distal end opening slides, and a distal end guide surface to return the cleaning tape from the distal end sliding surface to a tape return path.

* * * * *